(12) United States Patent  
Watanabe

(10) Patent No.: US 10,270,961 B2  
(45) Date of Patent: Apr. 23, 2019

(54) INFORMATION PROCESSING APPARATUS, INFORMATION PROCESSING METHOD, PROGRAM, AND SYSTEM

(71) Applicant: SONY CORPORATION, Tokyo (JP)

(72) Inventor: Keisuke Watanabe, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 53 days.

(21) Appl. No.: 15/518,379

(22) PCT Filed: Jan. 12, 2016

(86) PCT No.: PCT/JP2016/000111  
§ 371 (c)(1),  
(2) Date: Apr. 11, 2017

(87) PCT Pub. No.: WO2016/121305  
PCT Pub. Date: Aug. 4, 2016

(65) Prior Publication Data  
US 2017/0251142 A1    Aug. 31, 2017

(30) Foreign Application Priority Data  
Jan. 26, 2015 (JP) ................................ 2015-012199

(51) Int. Cl.  
*H04N 5/232* (2006.01)  
*G06F 3/0484* (2013.01)  
(Continued)

(52) U.S. Cl.  
CPC ....... *H04N 5/23216* (2013.01); *G06F 3/0482* (2013.01); *G06F 3/0484* (2013.01);  
(Continued)

(58) Field of Classification Search  
CPC ....... G06T 11/80; G06F 3/0482; G06F 3/0484  
See application file for complete search history.

(56) References Cited

U.S. PATENT DOCUMENTS

2006/0045292 A1   3/2006   Ando  
2007/0286596 A1*   12/2007   Lonn ................. H04N 1/00387  
                                                             396/429  
(Continued)

FOREIGN PATENT DOCUMENTS

EP            1630989 A2    3/2006  
EP            1942401 A1    7/2008  
(Continued)

OTHER PUBLICATIONS

Lefebvre, "Brighten, Zoom and Balance Your Way to Better Photos with iPhoto for iPad", https://web.archive.Org/web/20130513144641/http://www.cultofmac.com/173373/brighten-zoom-and-balance-your-way-to-better-photos-with-iphoto-for-ipad-ios-tips/, Published on Jun. 13, 2012, Retrieved on May 4, 2016, XP 055270516, 5 pages.*

(Continued)

*Primary Examiner* — James M Hannett  
(74) *Attorney, Agent, or Firm* — Oblon, McClelland, Maier & Neustadt, L.L.P.

(57) ABSTRACT

There is provided an information processing apparatus including circuitry configured to adjust an active parameter in accordance with touch on a touch panel in a first area other than a second area corresponding to a parameter graphical user interface (GUI) area, wherein the active parameter is a parameter related to color or brightness selected from among a plurality of selectable parameters related to color or brightness of an image captured by an imaging device.

19 Claims, 22 Drawing Sheets

(51) Int. Cl.
*G06F 3/0488* (2013.01)
*G06F 3/0482* (2013.01)

(52) U.S. Cl.
CPC ........ *G06F 3/0488* (2013.01); *G06F 3/04845* (2013.01); *G06F 3/04847* (2013.01); *G06F 3/04883* (2013.01); *H04N 5/23293* (2013.01); *G06F 2203/04803* (2013.01)

(56) References Cited

U.S. PATENT DOCUMENTS

| | | |
|---|---|---|
| 2008/0165141 A1 | 7/2008 | Christie |
| 2011/0239155 A1 | 9/2011 | Christie |
| 2014/0245226 A1 | 8/2014 | Butscher et al. |
| 2015/0046184 A1* | 2/2015 | Cocco .................. G06F 19/322 705/3 |
| 2016/0179355 A1* | 6/2016 | K S ..................... G06F 3/04847 715/771 |
| 2016/0239196 A1* | 8/2016 | Takahashi .......... H04N 5/23216 |

FOREIGN PATENT DOCUMENTS

| | | |
|---|---|---|
| JP | 2010-160581 | 7/2010 |
| JP | 2013-138351 | 7/2013 |
| JP | 2014-78855 | 5/2014 |
| WO | WO 2013-133905 A1 | 9/2013 |

OTHER PUBLICATIONS

Office Action dated Oct. 5, 2017 in Japanese Patent Application No. 2015-012199.

International Search Report dated May 24, 2016, in PCT/JP2016/000111, filed Jan. 12, 2016.

"PocketBook Touch User Manual", https://web.archive.org/web/20121223021307/http://download.pocketbook-int.com/fw/Foxconn/622/4.0/User_Guide_PocketBook_622EN.pdf, Published on Dec. 23, 2012, XP 055272109, 86 pages.

\* cited by examiner

[Fig. 1]
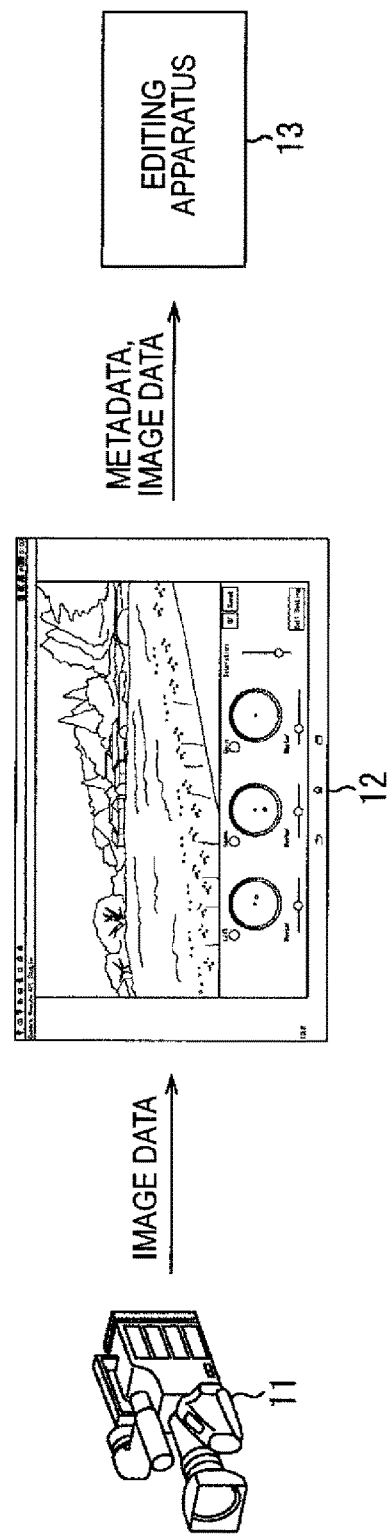

[Fig. 2]
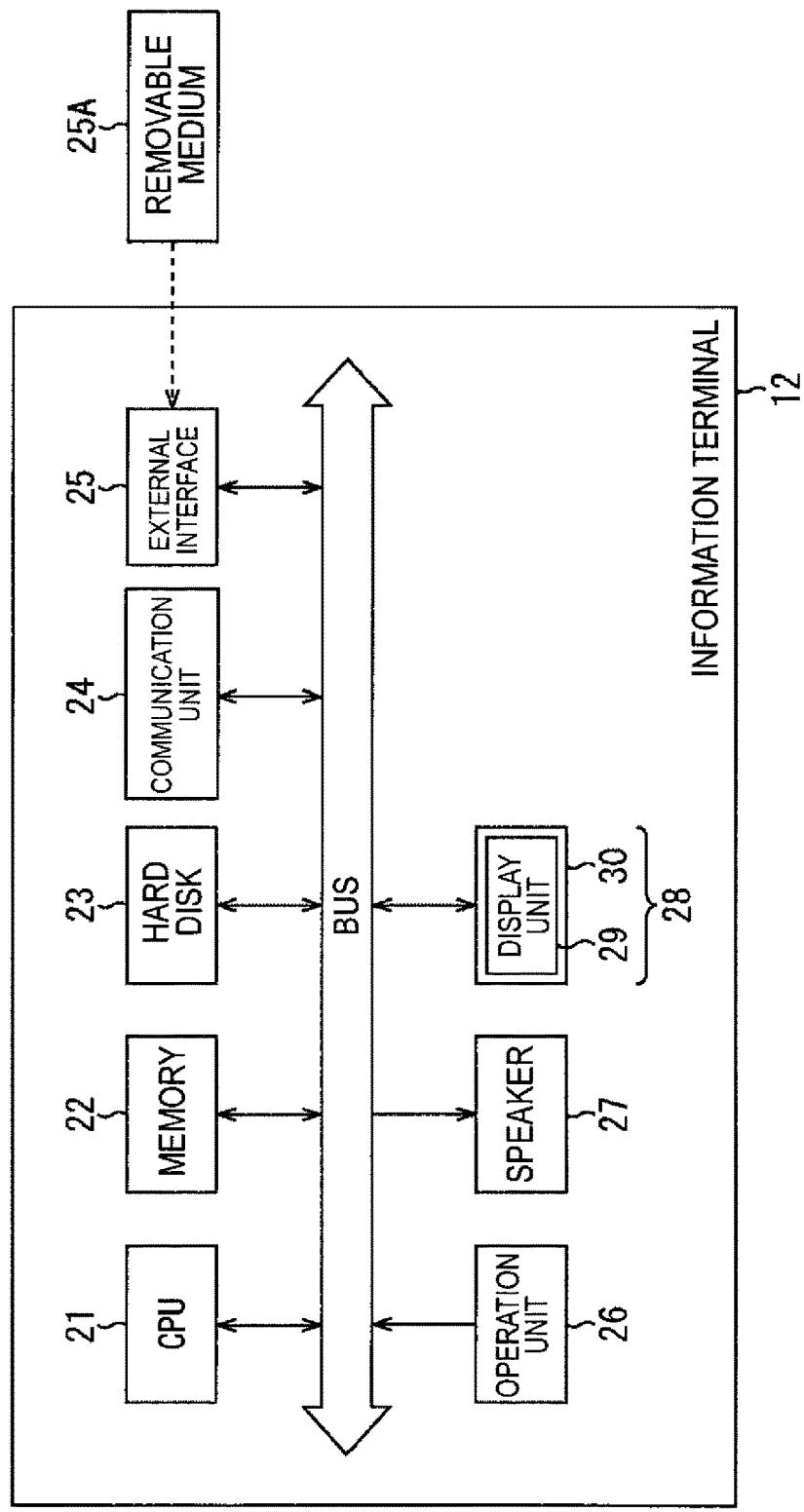

[Fig. 3]
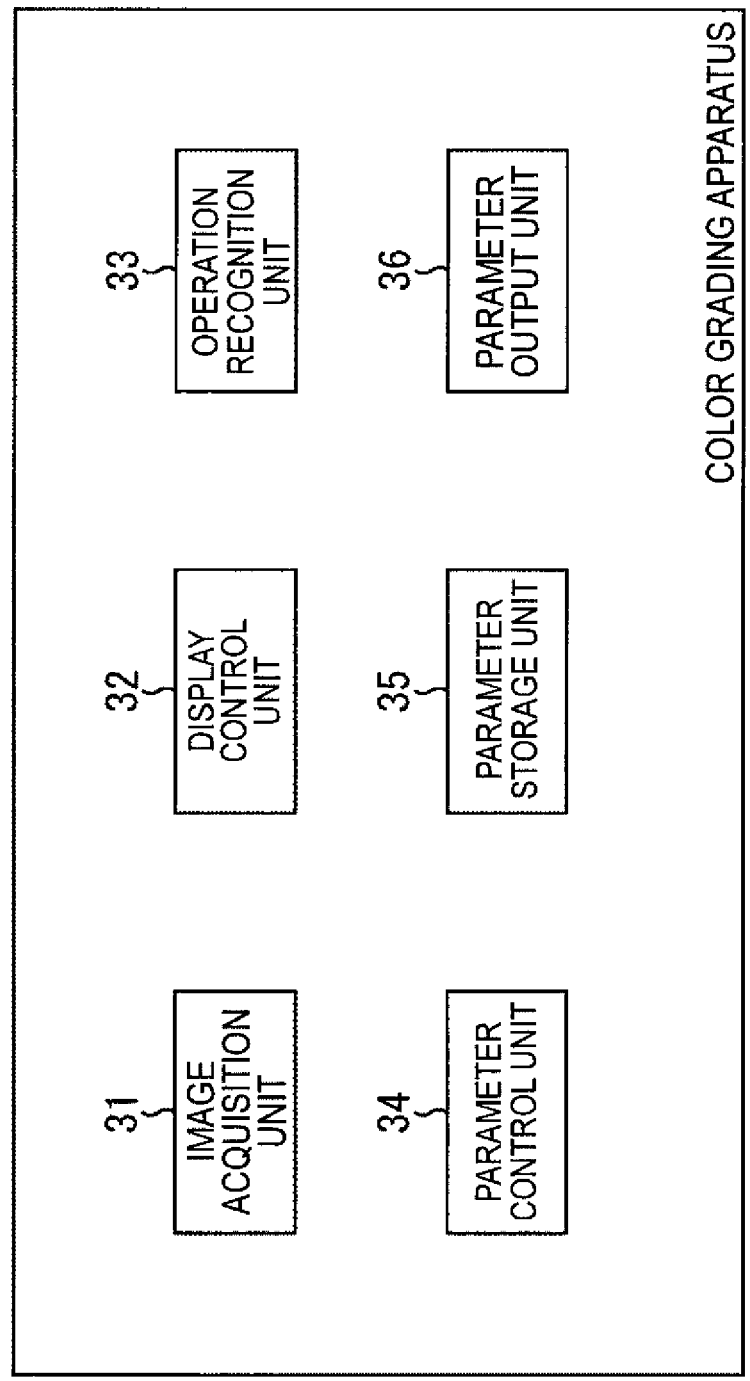

[Fig. 4]
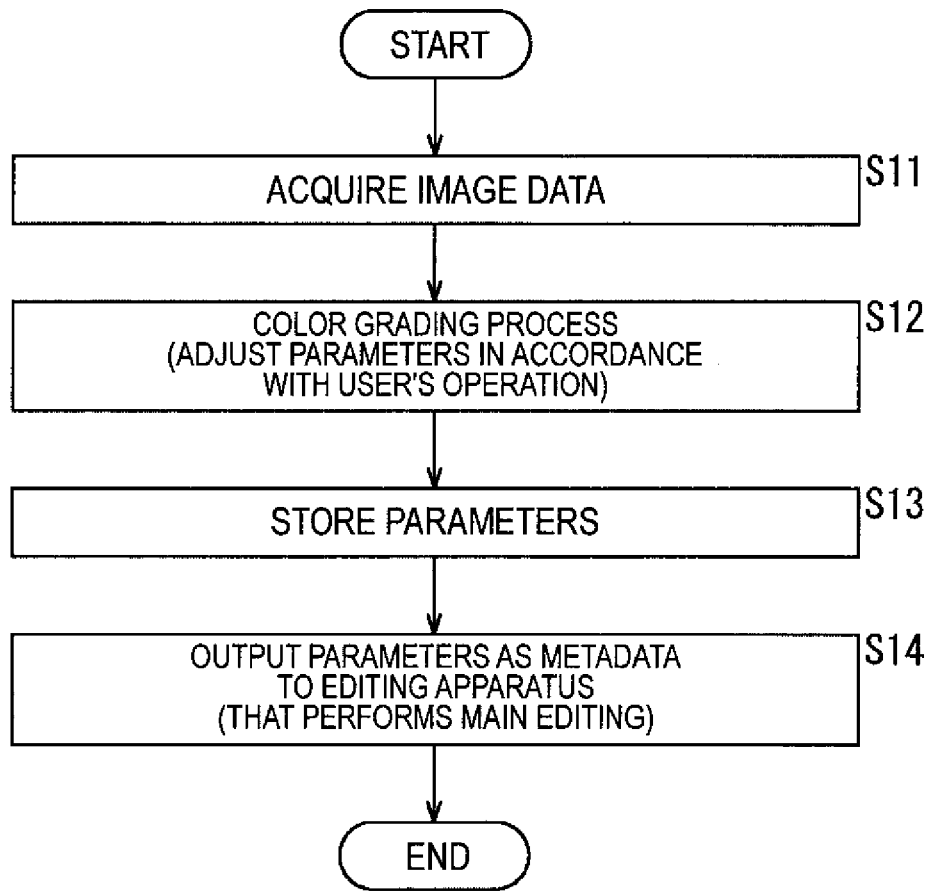

[Fig. 5]
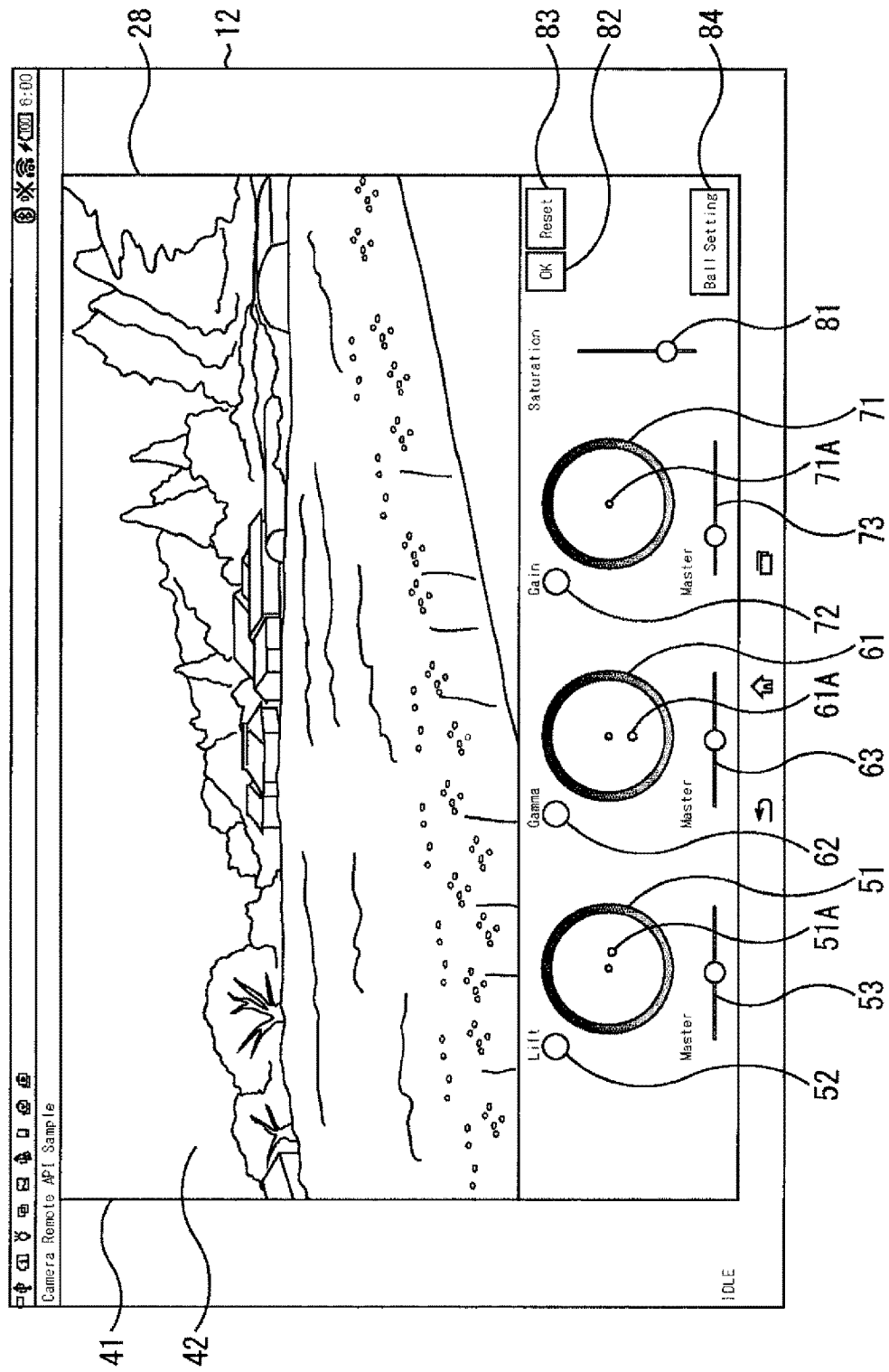

[Fig. 6]
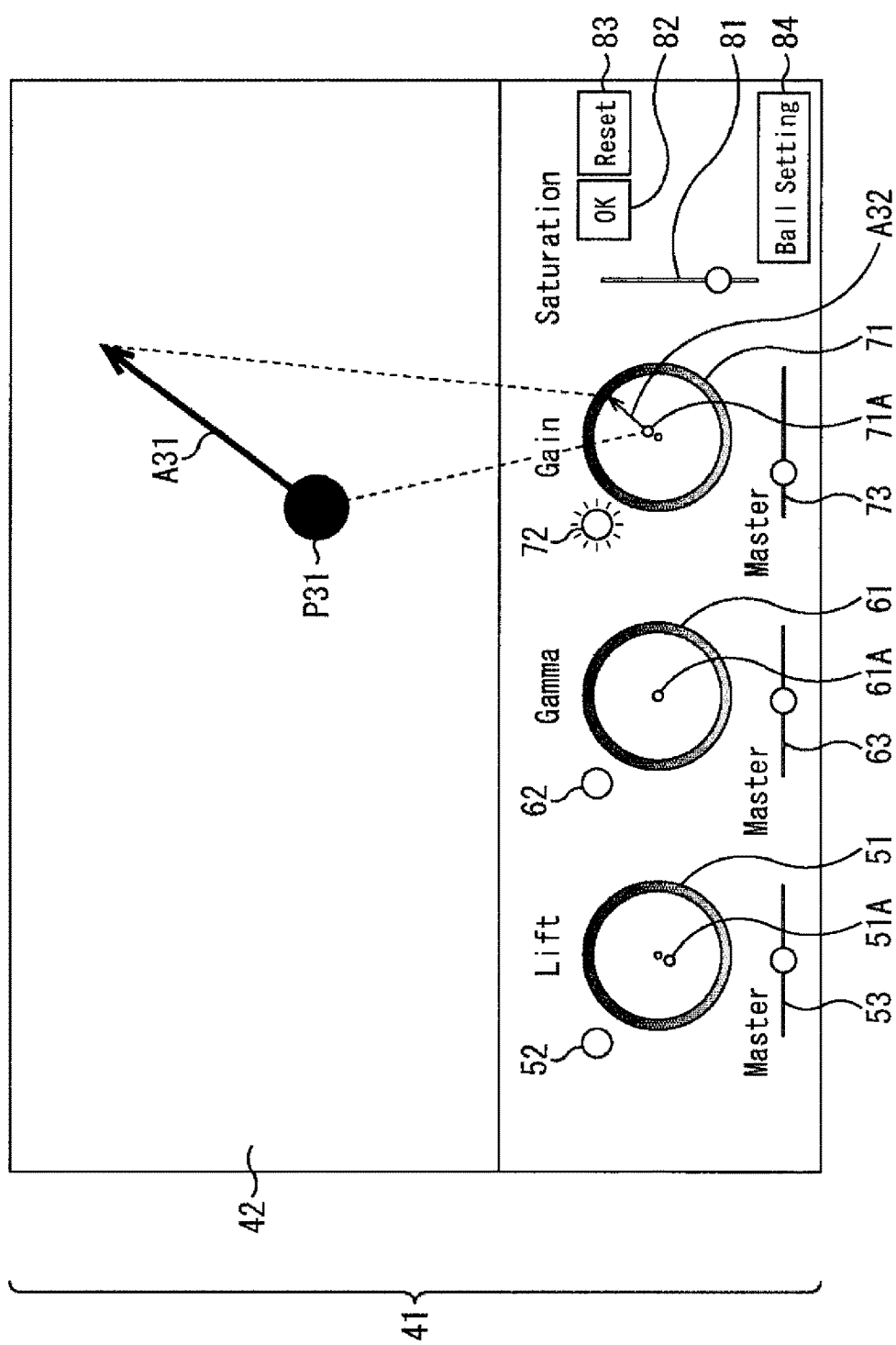

[Fig. 7]
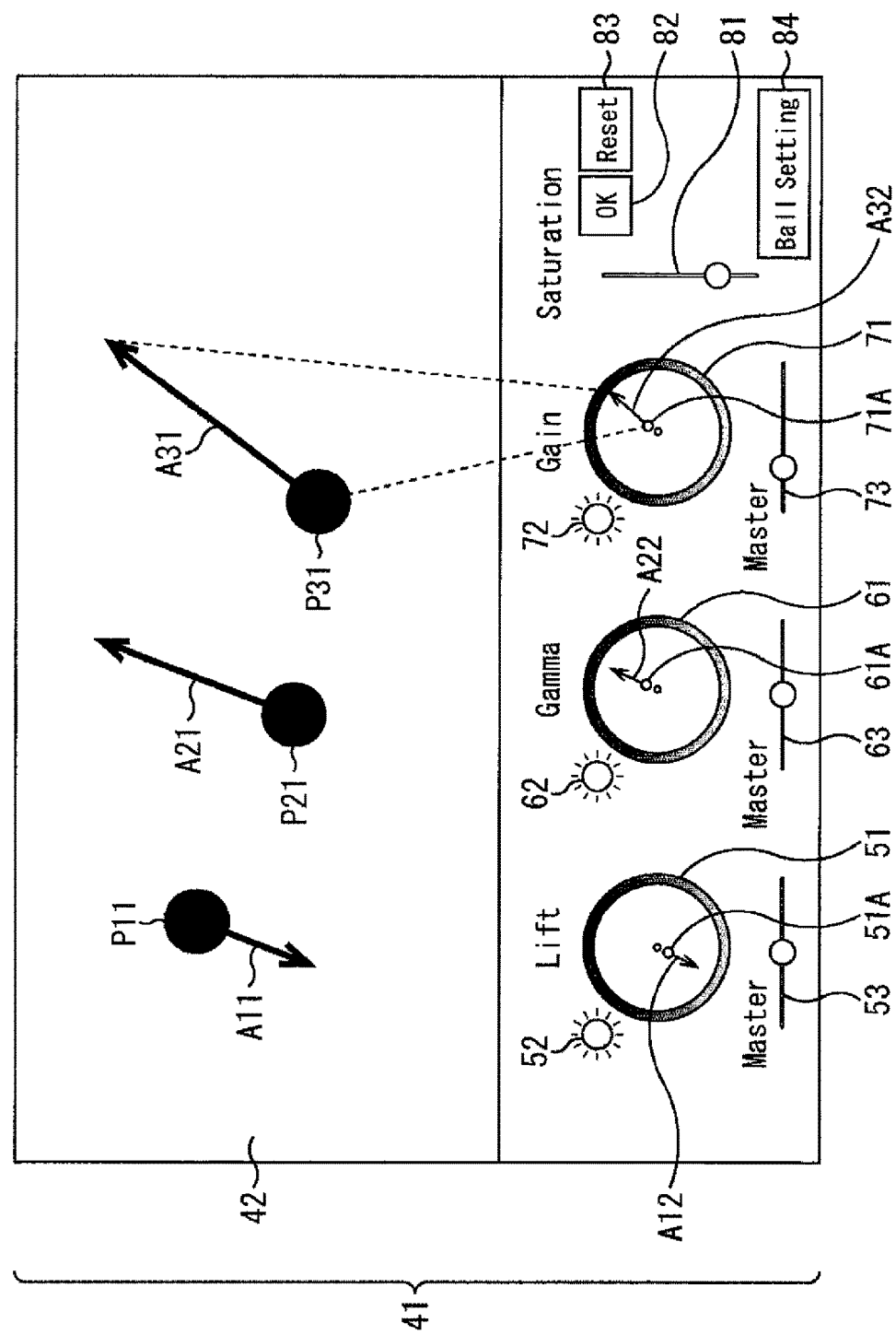

[Fig. 8]
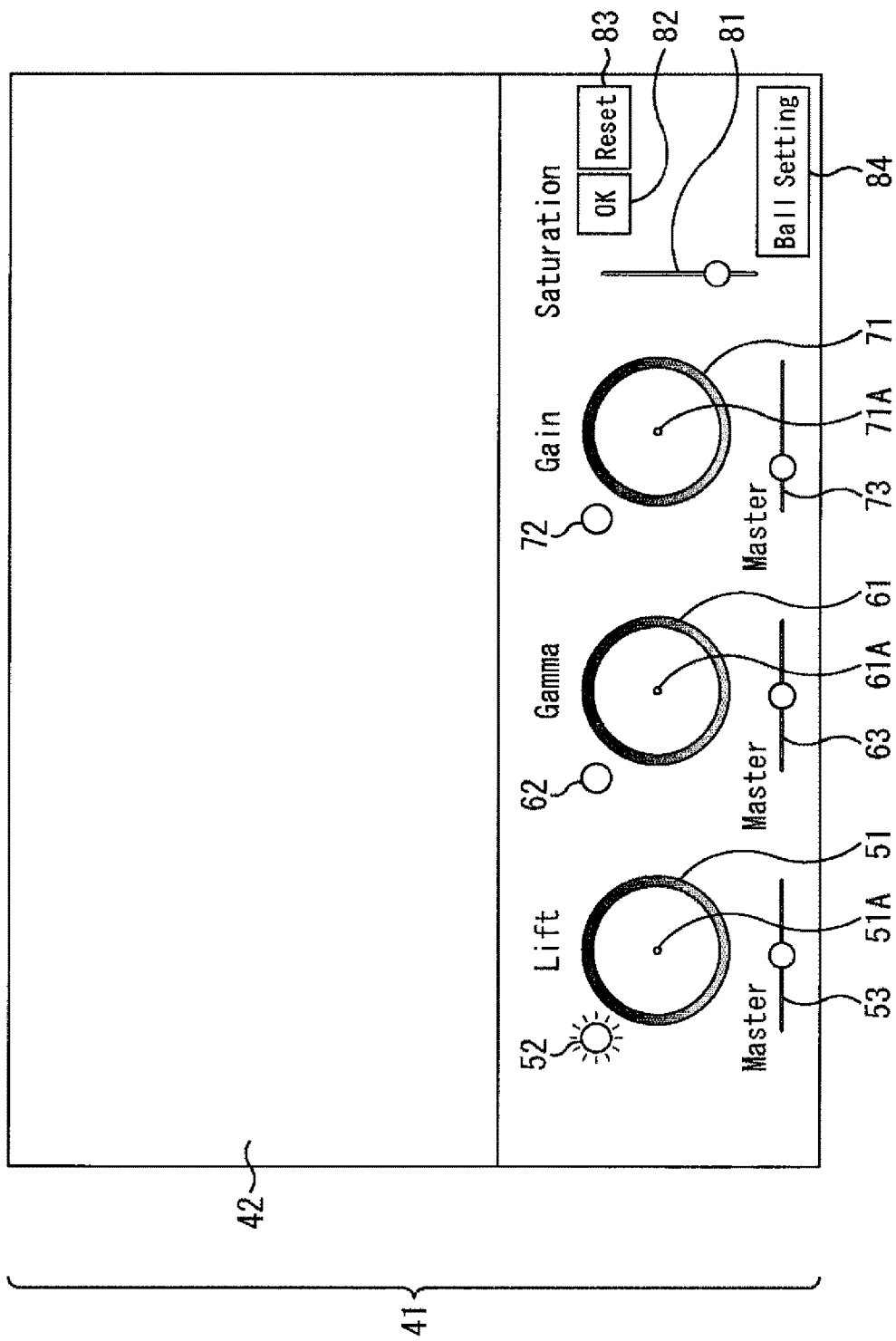

[Fig. 9]
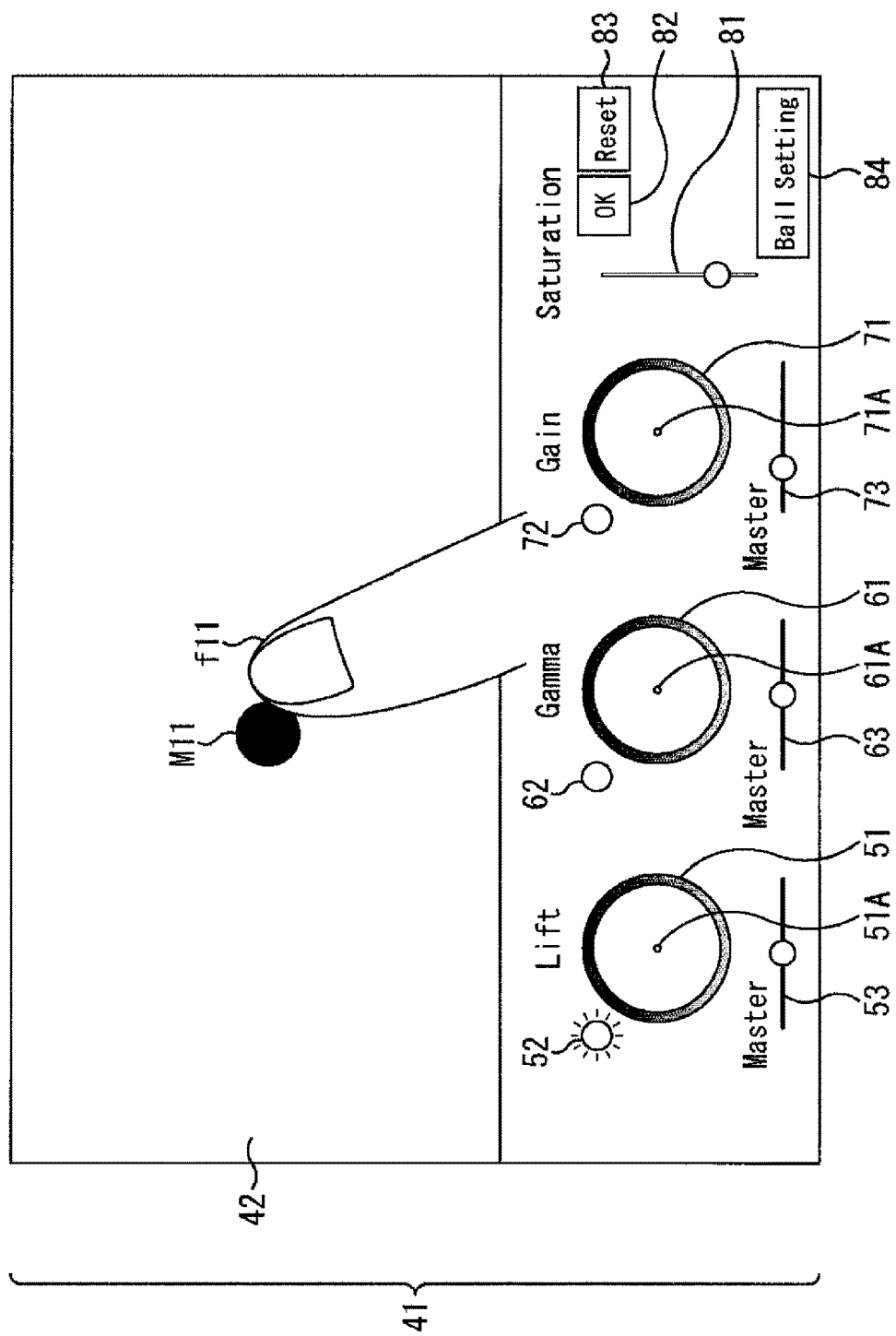

[Fig. 10]
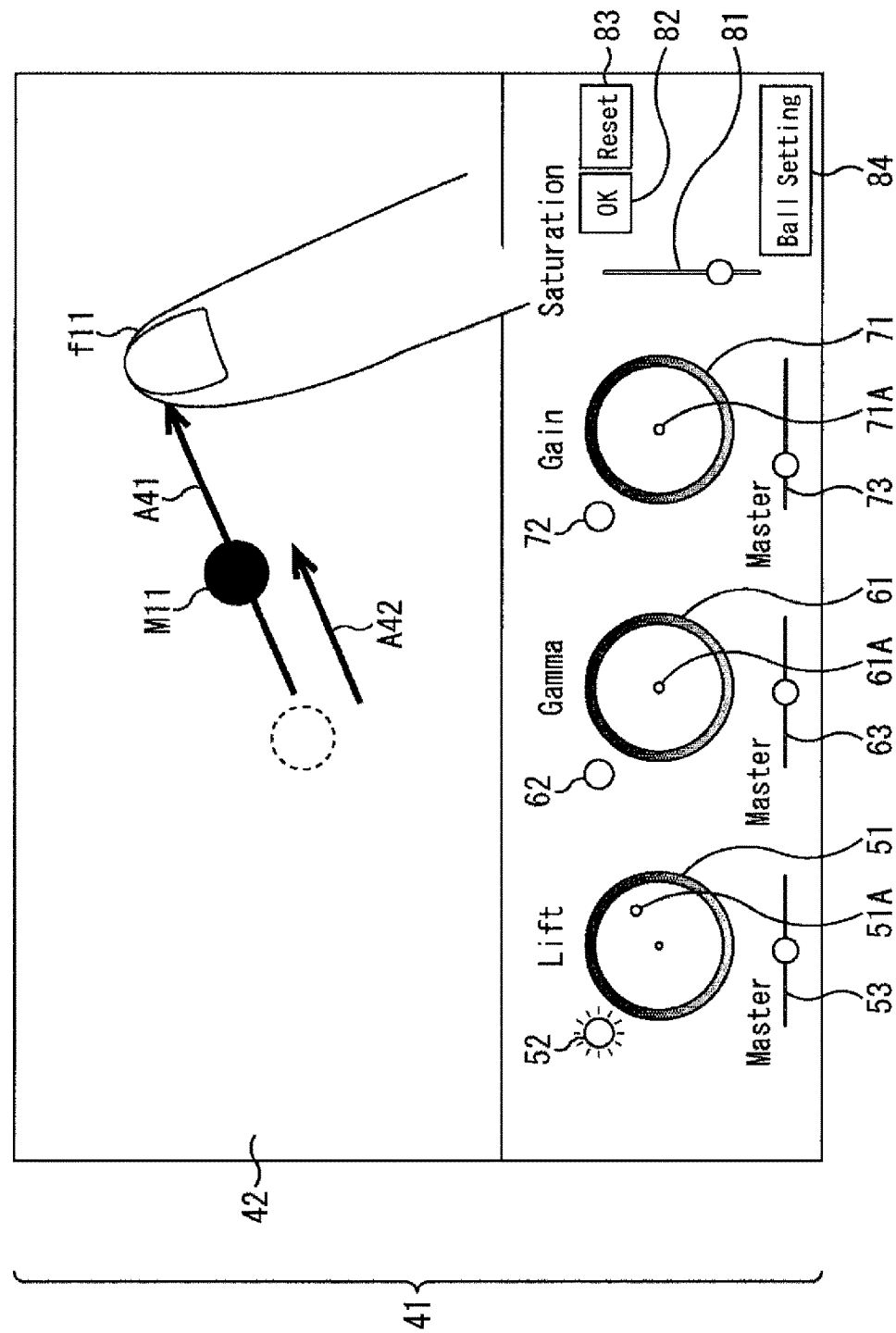

[Fig. 11]
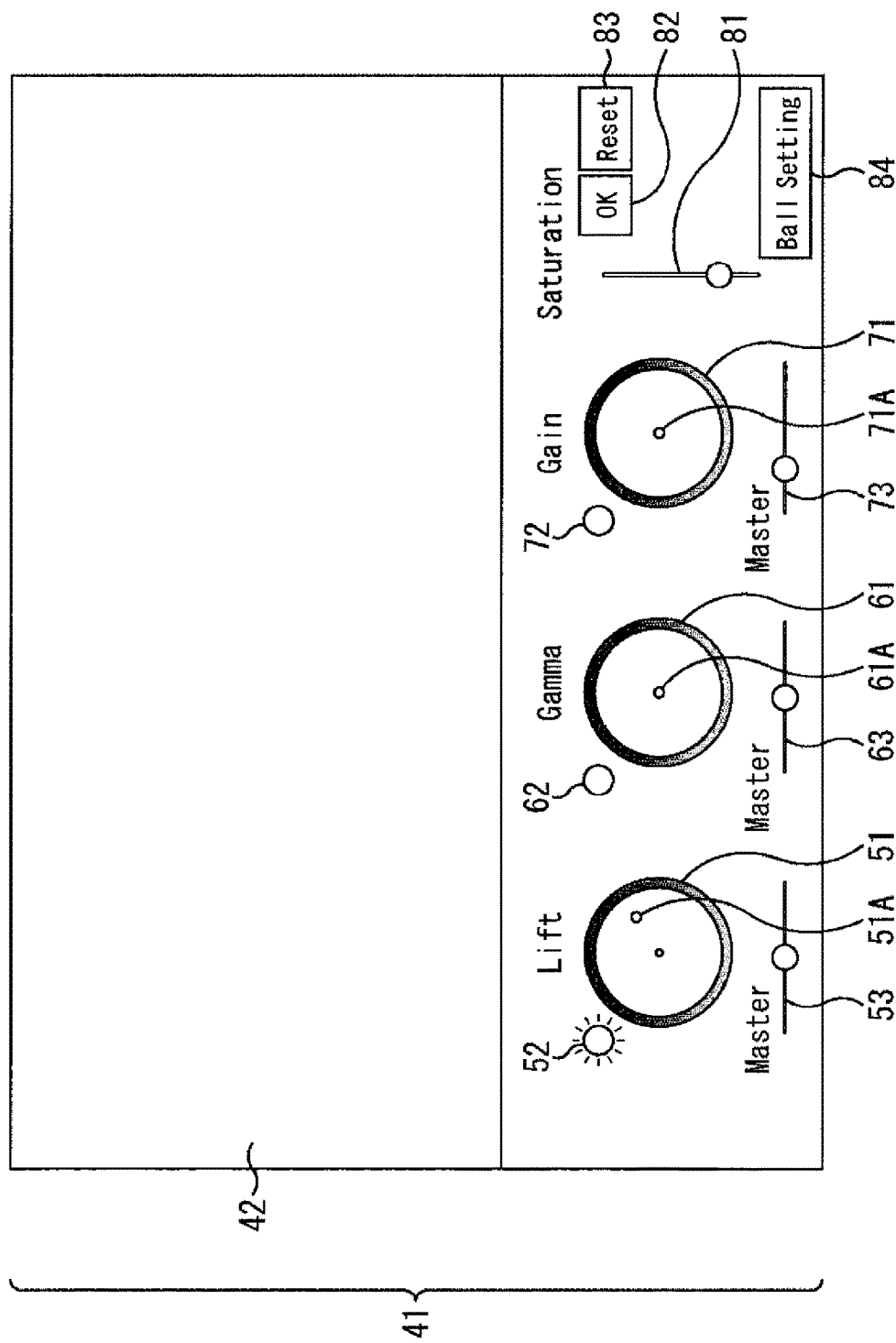

[Fig. 12]
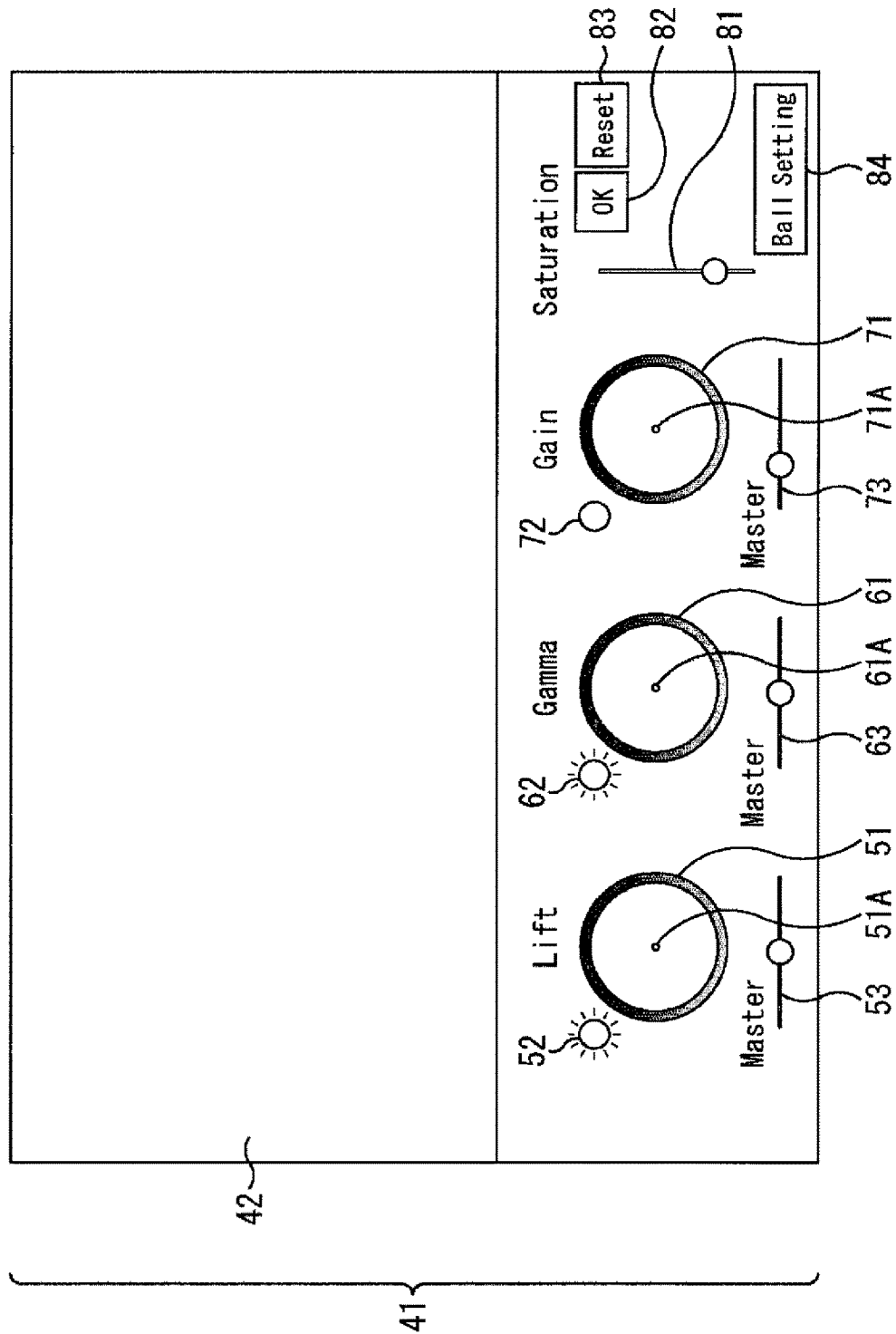

[Fig. 13]
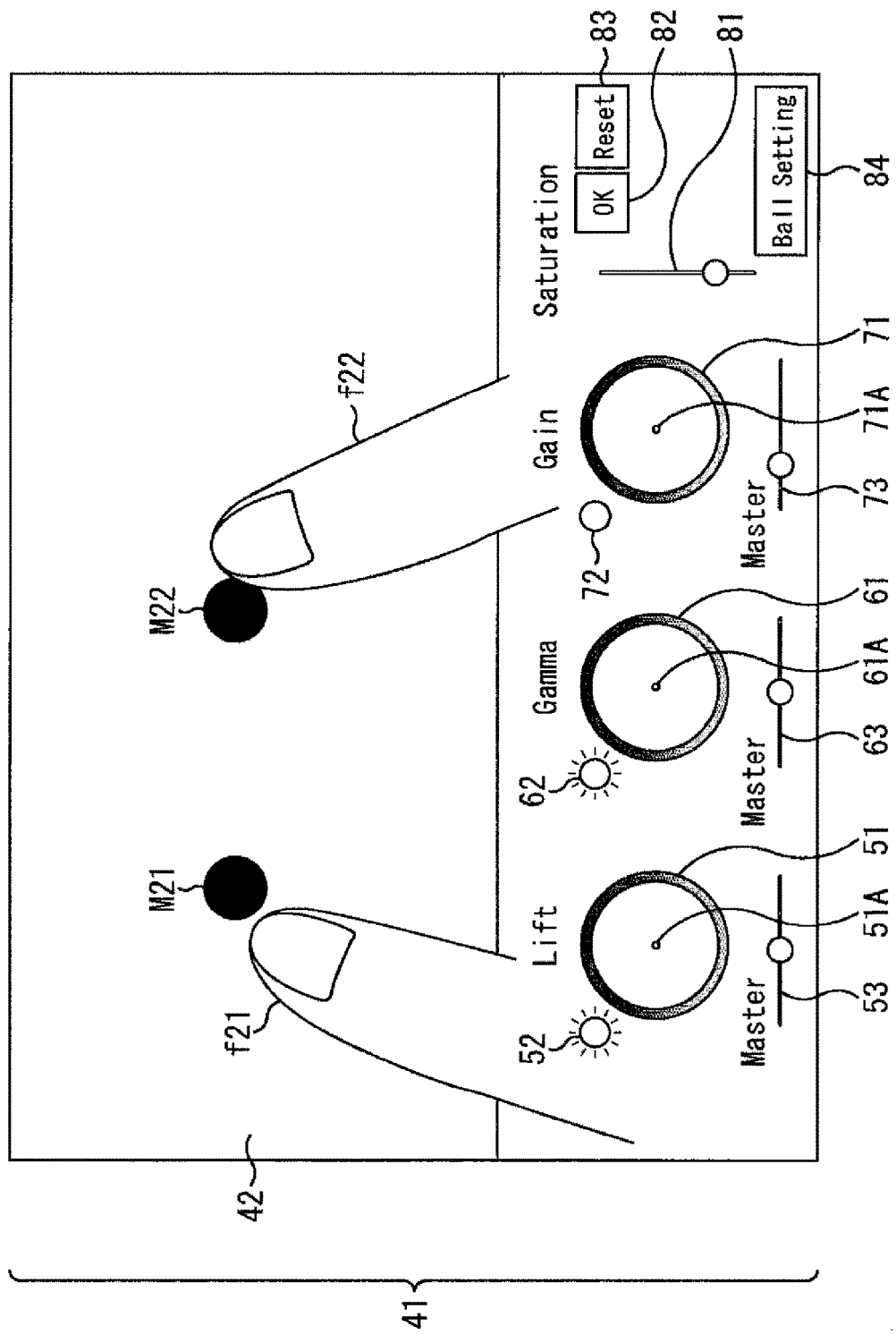

[Fig. 14]
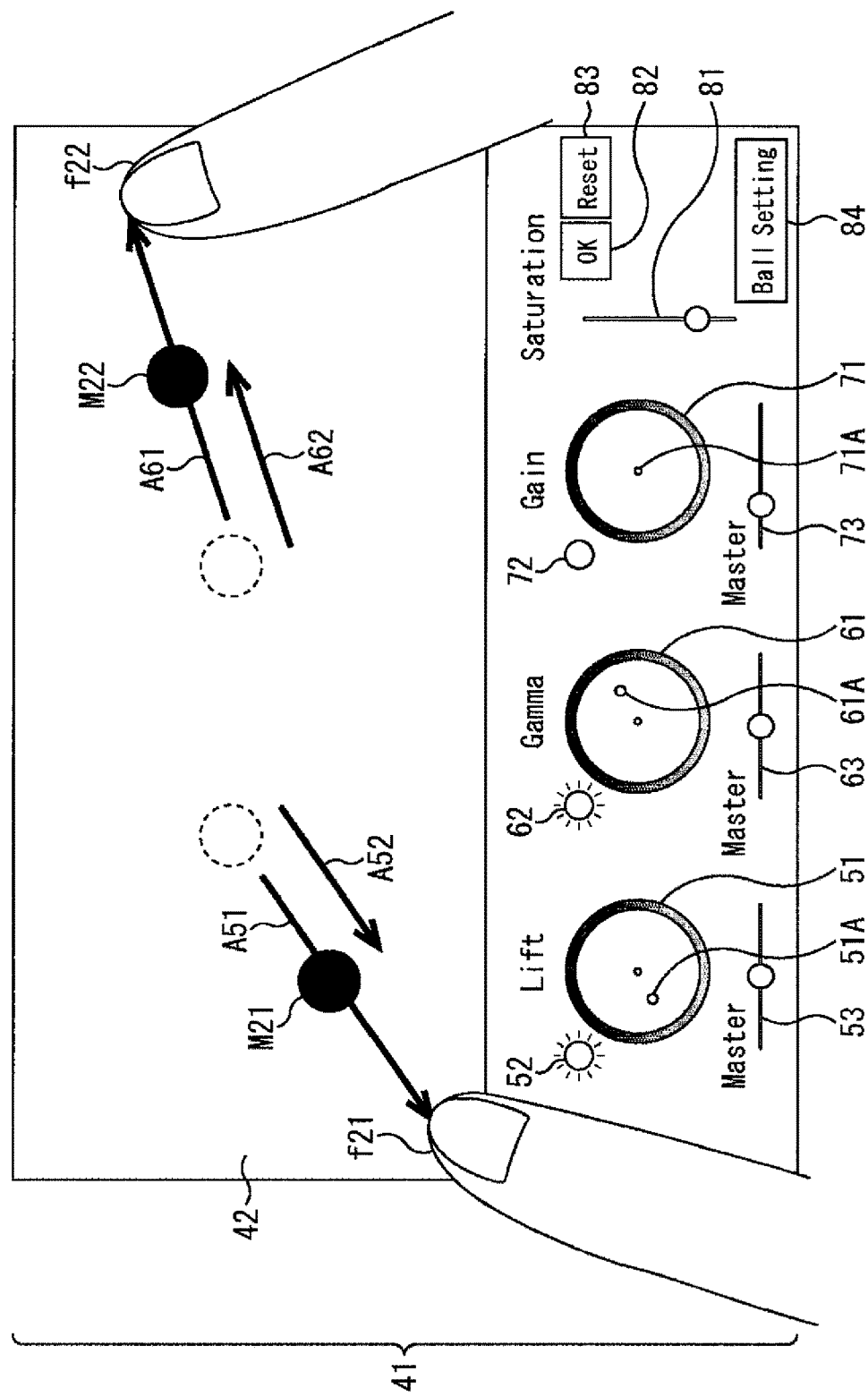

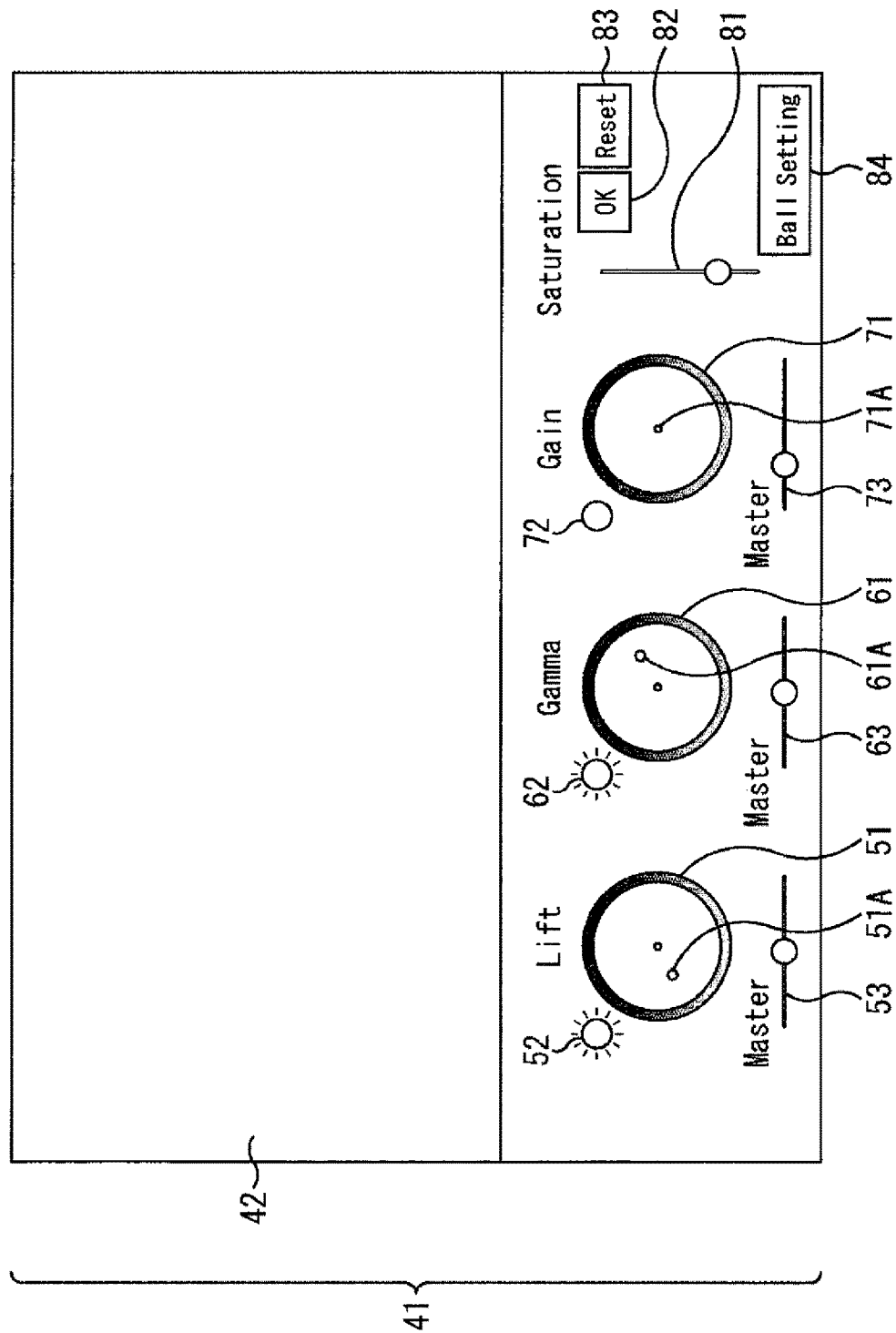

[Fig. 16]
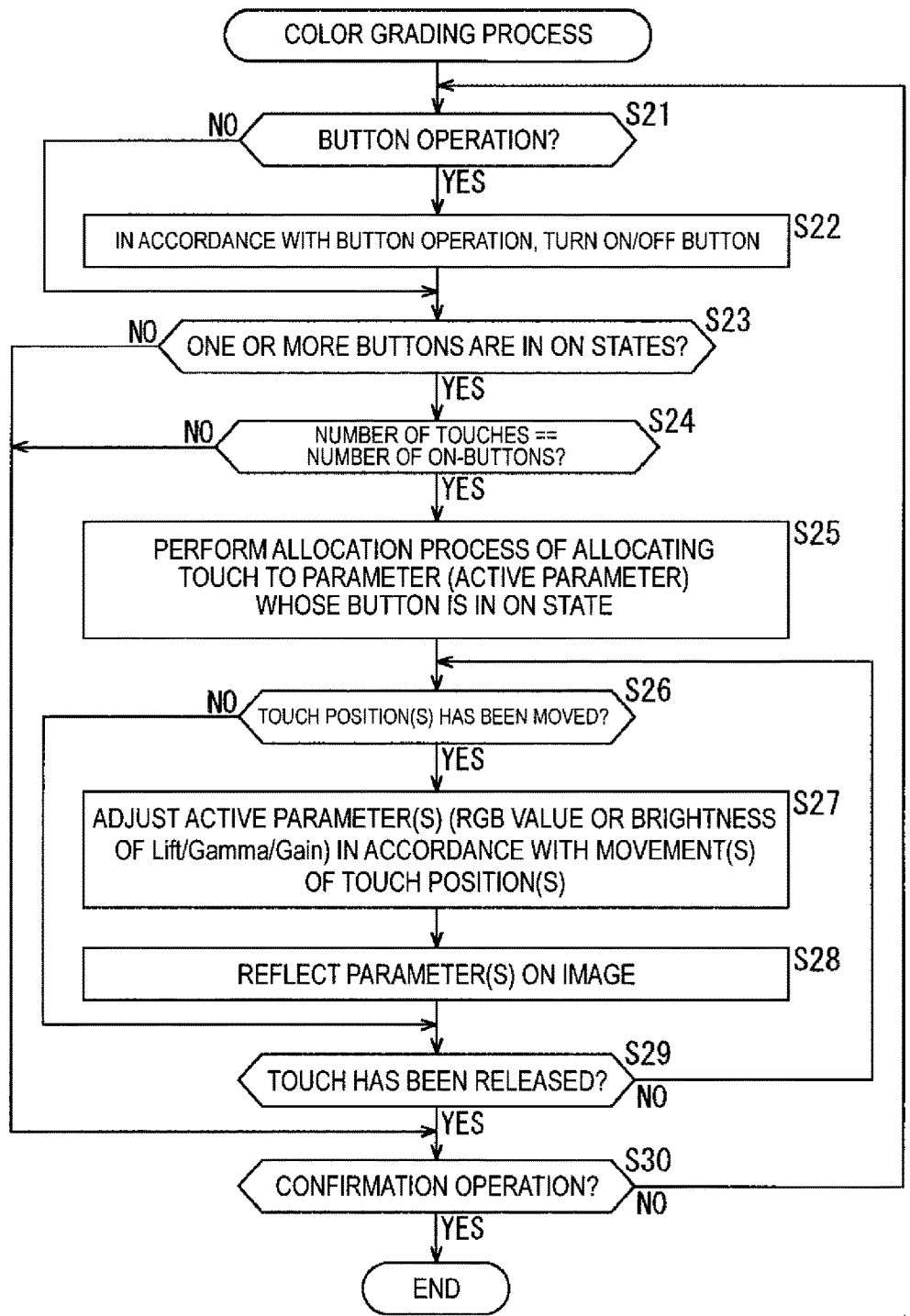

[Fig. 17]
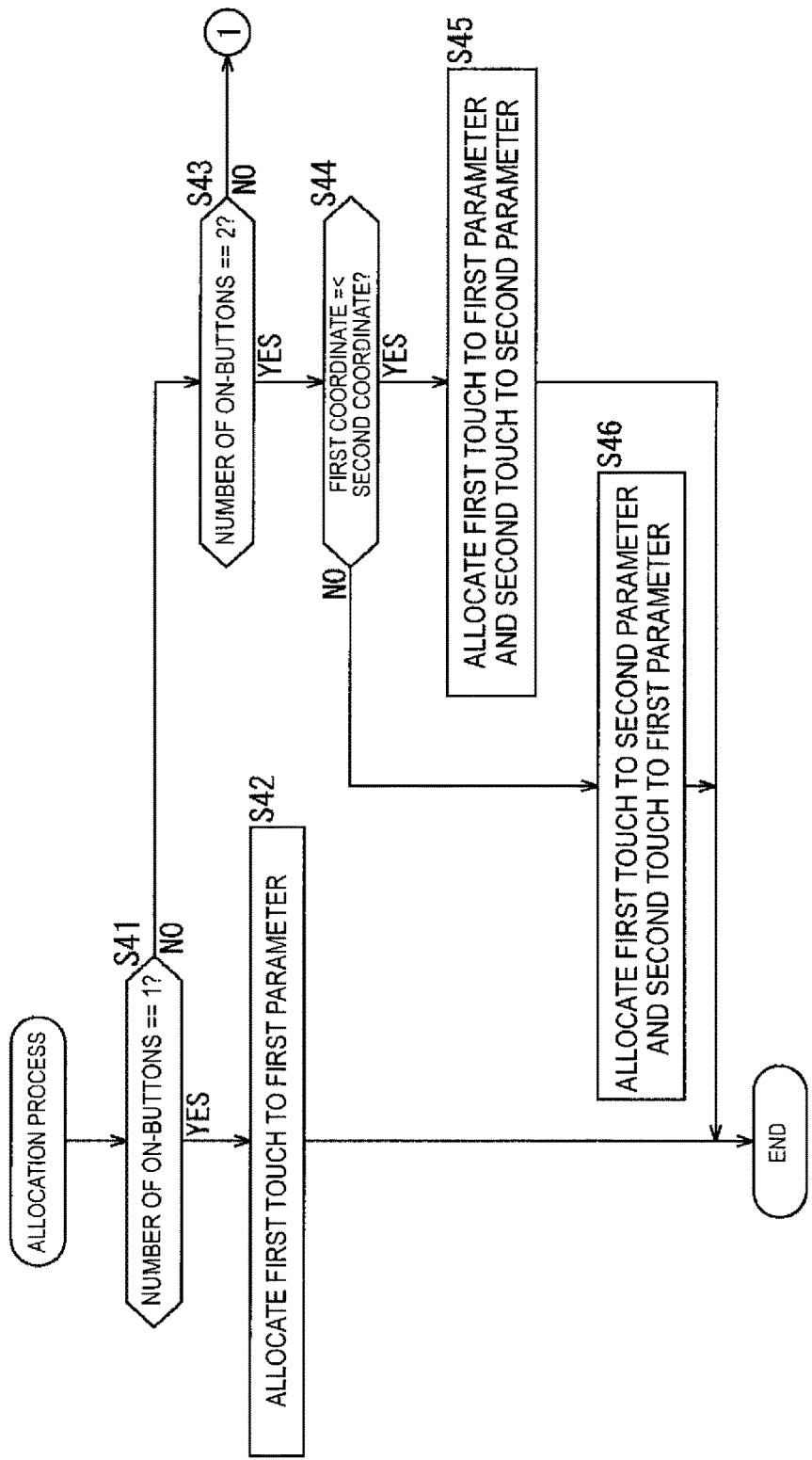

[Fig. 18]
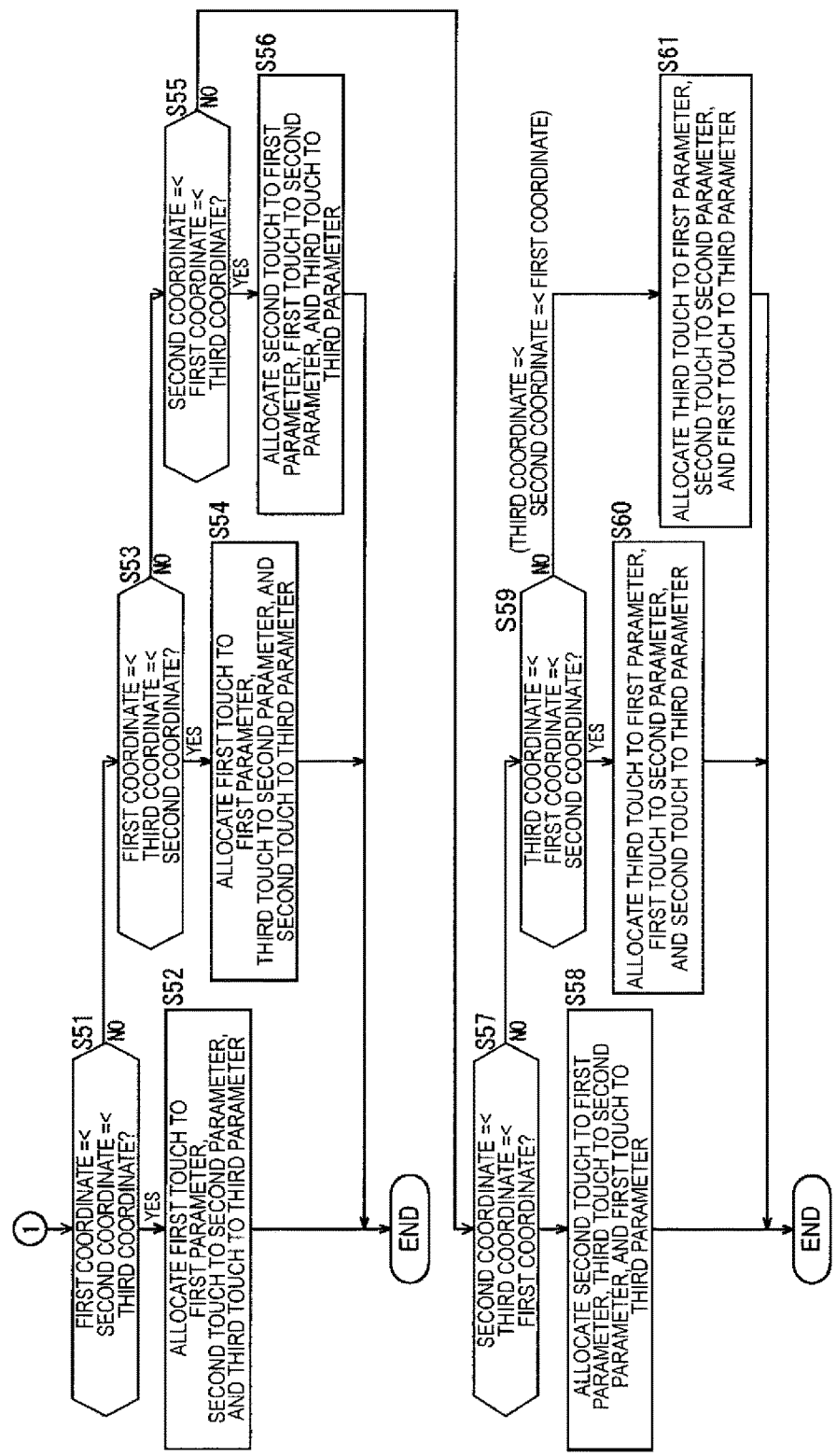

[Fig. 19]
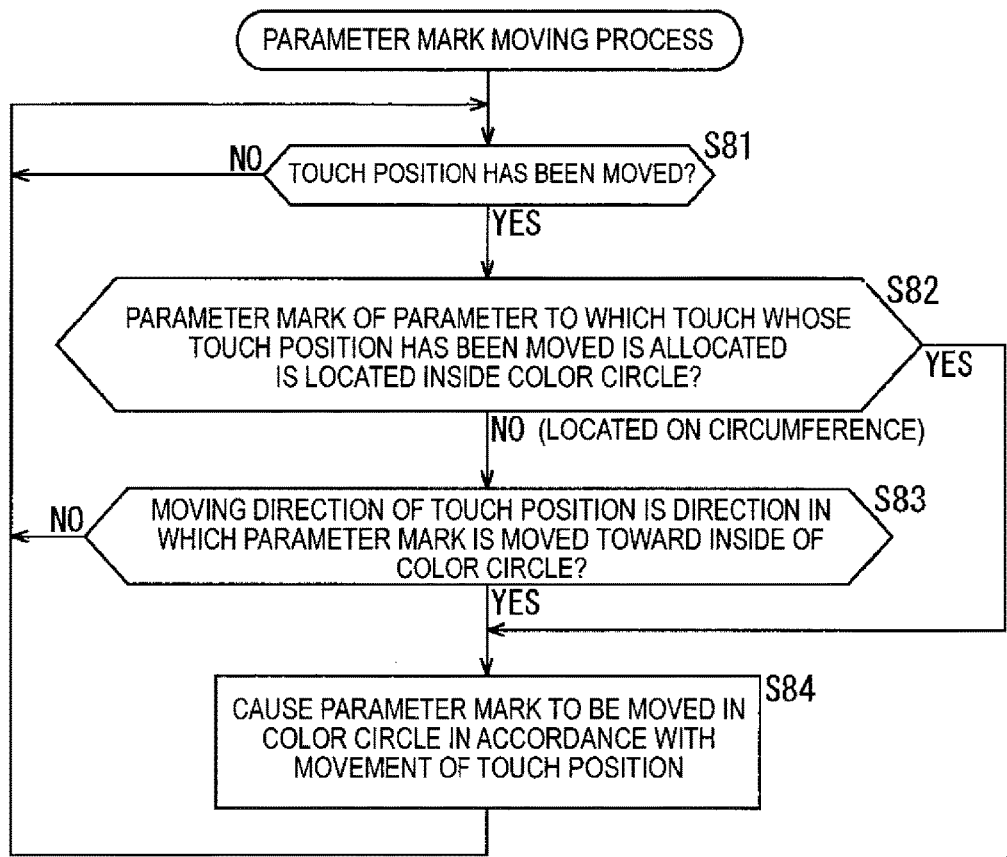

[Fig. 20]
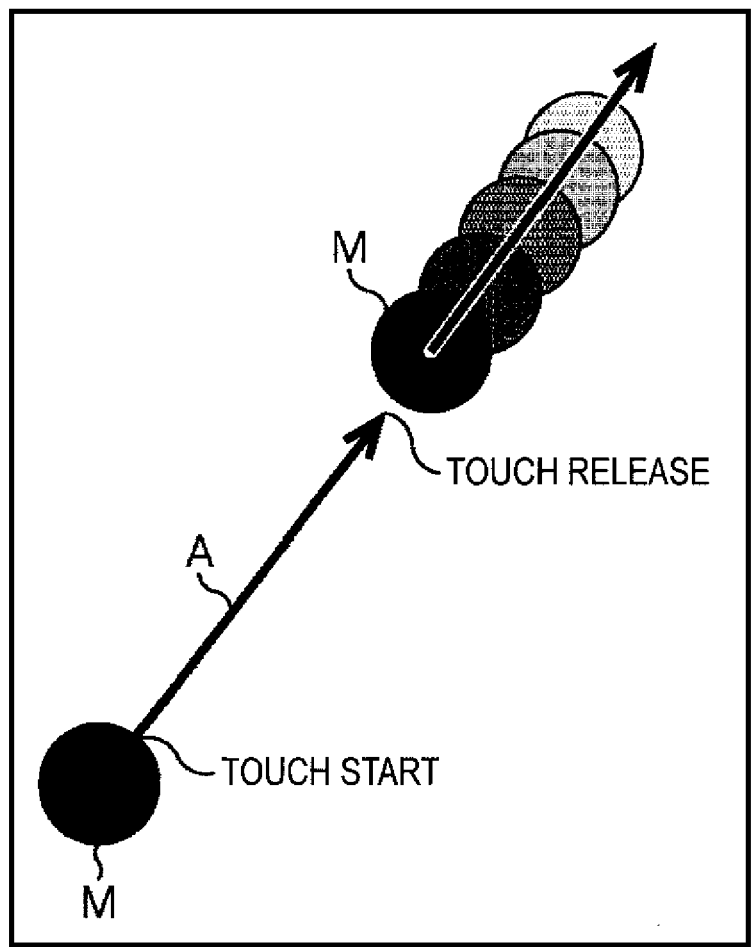

[Fig. 21]
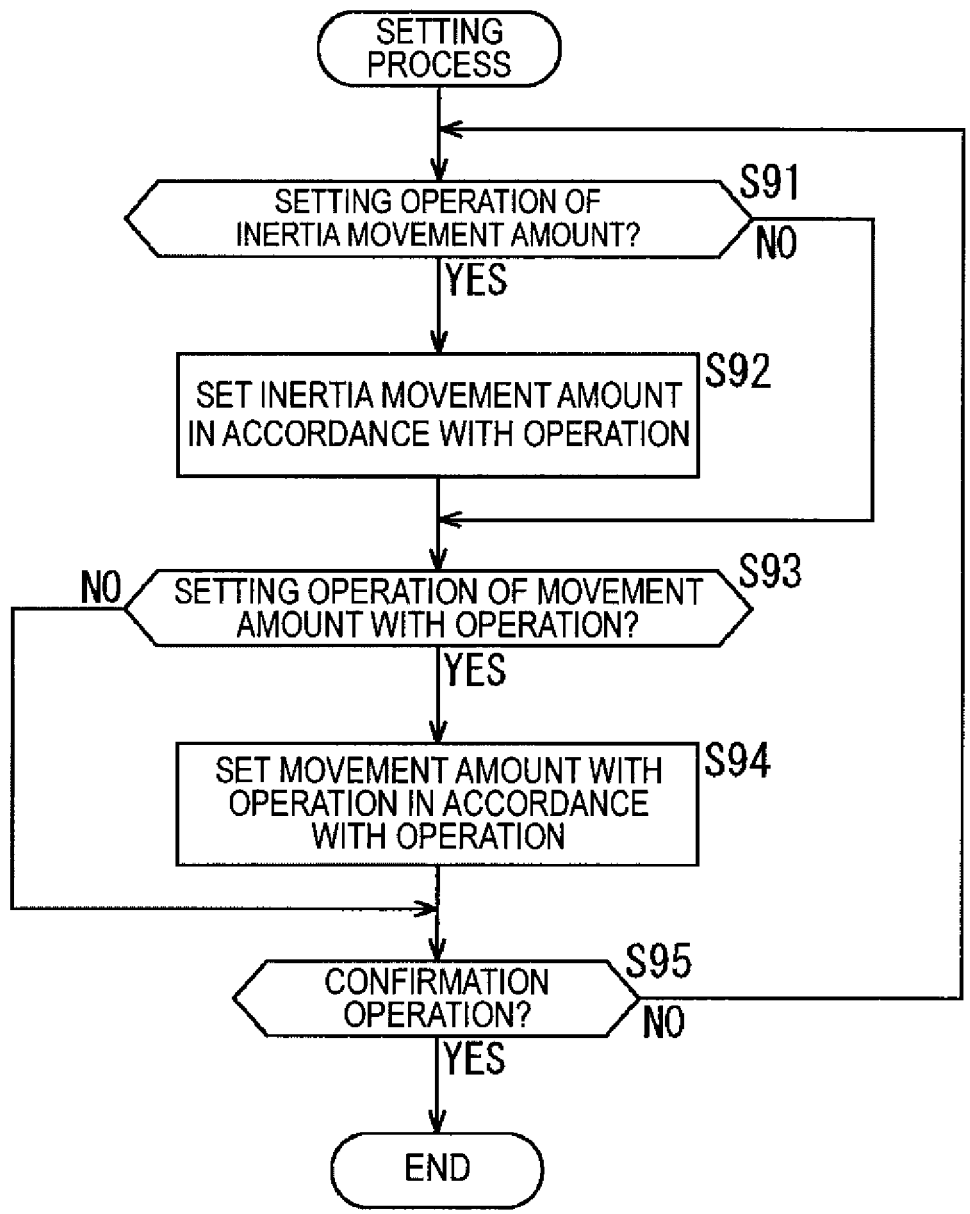

[Fig. 22]
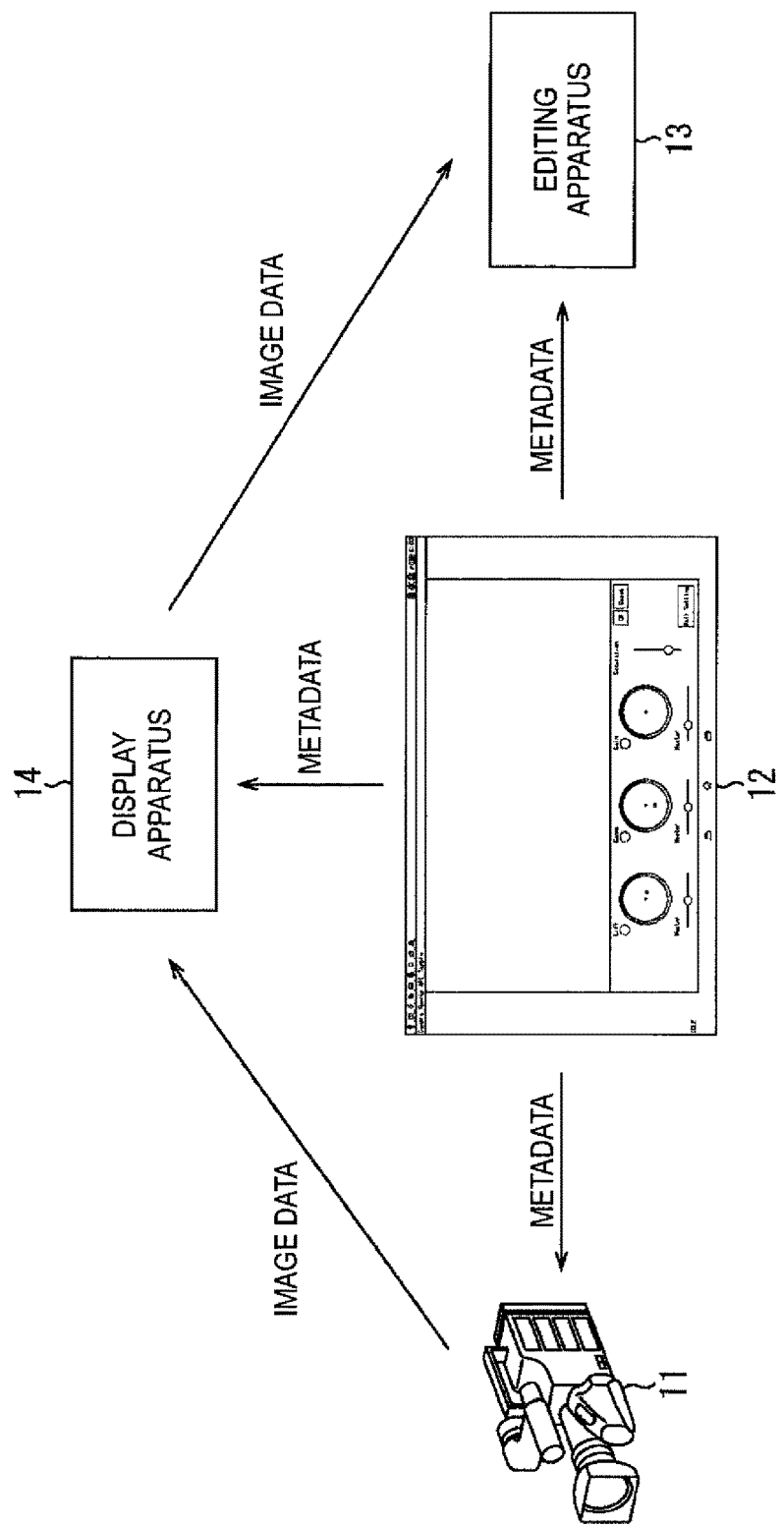

INFORMATION PROCESSING APPARATUS, INFORMATION PROCESSING METHOD, PROGRAM, AND SYSTEM

TECHNICAL FIELD

The present technology relates to information processing apparatuses, information processing methods, programs, and display apparatuses. The present technology more particularly relates to an information processing apparatus, information processing method, program, and display apparatus that facilitates a color grading process, for example.

CROSS REFERENCE TO RELATED APPLICATIONS

This application claims the benefit of Japanese Priority Patent Application JP 2015-012199 filed Jan. 26, 2015, the entire contents of which are incorporated herein by reference.

BACKGROUND ART

For example, in production of content, such as a movie or a TV program, post-production including color grading (color correction) and editing is performed after shooting.

In color grading, various parameters related to color and brightness are adjusted. Examples of the parameters adjusted in color grading include the ASC-CDL (American Society of Cinematographers Color Decision List). In the ASC-CDL, values of parameters of RGB related to each of Slope, Offset, and Power are specified.

As a user interface that adjusts an RGB value of each of Slope, Offset, and Power specified by the ASC-CDL, a user interface that adjusts an RGB value by a slider operation or an input of a numerical value has been proposed (for example, see PTL 1).

According to the user interface disclosed in PTL 1, since the RGB value of each of Slope, Offset, and Power can be adjusted, Slope, Offset, and Power can be fine adjusted.

However, since the user interface disclosed in PTL 1 can adjust nine parameters (parameters of RGB of each of Slope, Offset, and Power), an intuitive operation is difficult and the process of color grading may take much time.

CITATION LIST

Patent Literature

PTL 1: JP 2013-138351A

SUMMARY OF INVENTION

Technical Problem

As for post-production, there has been a demand for the proposal for techniques that facilitate the process of color grading.

The present technology has been made in view of such circumstances, and can facilitate the process of color grading.

Solution to Problem

An information processing apparatus according to one or more embodiments of the present technology can comprise: circuitry or a hardware processor configured to adjust an active parameter in accordance with touch on a touch panel in a first area other than a second area corresponding to a parameter graphical user interface (GUI) area, wherein the active parameter is a parameter related to color or brightness selected from among a plurality of selectable parameters related to color or brightness of an image captured by an imaging device.

An information processing method according to one or more embodiments of the present technology can comprise: adjusting an active parameter in accordance with touch on a touch panel in a first area other than a second area corresponding to a parameter graphical user interface (GUI) area, wherein the active parameter is a parameter related to color or brightness selected from among a plurality of selectable parameters related to color or brightness of an image captured by an imaging device. Additionally, one or more embodiments of the present technology can include a non-transitory computer-readable storage medium storing computer-readable instructions that, when executed by a computer, cause the computer to perform a method comprising: adjusting an active parameter in accordance with touch on a touch panel in a first area other than a second area in which the active parameter is selected by a user, wherein the active parameter is a parameter related to color or brightness selected from among a plurality of selectable parameters related to color or brightness of an image captured by an imaging device.

A display apparatus according to one or more embodiments of the present technology can comprise: circuitry configured to adjust an active parameter in accordance with touch on a touch panel in a first area other than a second area corresponding to a parameter graphical user interface (GUI) area, and cause an image reflecting the parameter to be displayed on the touch panel; and the touch panel, wherein the active parameter is a parameter related to color or brightness selected from among a plurality of selectable parameters related to color or brightness of an image captured by an imaging device. Additionally, one or more embodiments of the present technology can include a system comprising: an information processing apparatus having circuitry configured to adjust an active parameter in accordance with touch on a touch panel in a first area other than a second area corresponding to a parameter graphical user interface (GUI) area; and an imaging apparatus having circuitry configured to output data regarding an image to the information processing apparatus, wherein the active parameter is a parameter related to color or brightness selected from among a plurality of selectable parameters related to color or brightness of the image captured by the imaging apparatus.

In the information processing apparatus, information processing method, program, display apparatus, and system according to embodiments of the present technology, among a plurality of parameters related to color and brightness, an active parameter, which is a parameter whose button is in an on state, the button being operated when the adjustment of the parameter is activated, is adjusted in accordance with a touch at a given position on a touch panel.

Note that the information processing apparatus may be an independent apparatus or an internal block constituting one apparatus.

In addition, the program may be provided by being transmitted via a transmitting medium or by being recorded on a recording medium.

Advantageous Effects of Invention

According to an embodiment of the present technology, the process of color grading can be facilitated.

The effects described in the specification are not limiting. That is, the present disclosure can exhibit any of the effects that are described in the present disclosure.

BRIEF DESCRIPTION OF DRAWINGS

FIG. 1 is a block diagram illustrating a configuration example of an embodiment of an image processing system to which the present technology is applied.

FIG. 2 is a block diagram illustrating a configuration example of hardware of an information terminal 12.

FIG. 3 is a block diagram illustrating a configuration example of a color grading apparatus that is functionally achieved by a CPU 21 executing a color grading application.

FIG. 4 is a flowchart illustrating an example of a process of a color grading apparatus.

FIG. 5 illustrates a display example of a screen displayed by a color grading apparatus (the information terminal 12 serving as the color grading apparatus) on a touch panel 28.

FIG. 6 illustrates a display example of a main screen 41.

FIG. 7 illustrates an example of an operation on the main screen 41 when grading parameters are adjusted.

FIG. 8 illustrates an example of an operation on the main screen 41 when a grading parameter is adjusted.

FIG. 9 illustrates an example of an operation on the main screen 41 when a grading parameter is adjusted.

FIG. 10 illustrates an example of an operation on the main screen 41 when a grading parameter is adjusted.

FIG. 11 illustrates an example of an operation on the main screen 41 when a grading parameter is adjusted.

FIG. 12 illustrates an example of an operation on the main screen 41 when grading parameters are adjusted.

FIG. 13 illustrates an example of an operation on the main screen 41 when grading parameters are adjusted.

FIG. 14 illustrates an example of an operation on the main screen 41 when grading parameters are adjusted.

FIG. 15 illustrates an example of an operation on the main screen 41 when grading parameters are adjusted.

FIG. 16 is a flowchart illustrating an example of a color grading process.

FIG. 17 is a flowchart illustrating an example of an allocation process.

FIG. 18 is a flowchart illustrating an example of an allocation process.

FIG. 19 is a flowchart illustrating an example of a parameter mark moving process.

FIG. 20 illustrates an example of a mode of a movement of a touch mark.

FIG. 21 is a flowchart illustrating an example of a setting process.

FIG. 22 is a block diagram illustrating a configuration example of another embodiment of an image processing system to which the present technology is applied.

DESCRIPTION OF EMBODIMENTS

<Embodiment of Image Processing System to Which the Present Technology is Applied>

FIG. 1 is a block diagram illustrating a configuration example of an embodiment of an image processing system to which the present technology is applied.

In FIG. 1, the image processing system includes a camera 11, an information terminal 12, and an editing apparatus 13.

The camera 11 captures an image as content, such as a movie or a TV program, and acquires image data such as RAW data of the image. The camera 11 transmits the image data by, for example, a wireless LAN (Local Area Network) such as Wi-Fi.

The information terminal 12 is an information terminal, such as a tablet or a notebook PC (Personal Computer), which acquires the image data transmitted from the camera 11, and performs a color grading process on the image data.

That is, in accordance with the operation of the information terminal 12 by a user who performs color grading, the information terminal 12 sets color grading parameters, i.e., parameters related to color and brightness, and stores (registers) the parameters in an EDL (Edit Decision List).

Here, color grading may be performed on a menu screen of the camera 11, for example. By employing a mobile terminal, such as a tablet, as the information terminal 12, the information terminal 12 can be carried to a site where the camera 11 captures an image, and at the site, the information terminal 12 can perform color grading on the image immediately after being captured by the camera 11. The color grading using the information terminal 12 enables an intuitive operation, and facilitates the color grading without having to take much time, as will be described later.

To utilize the parameters in a work flow of post-production afterward, the parameters being set for the image data from the camera 11, the information terminal 12 supplies the EDL storing the parameters as metadata of the image data, in addition to the image data, to the editing apparatus 13.

Here, an example of the color grading parameters that is set by the information terminal 12 is the ASC-CDL. In the ASC-CDL, each parameter of RGB of each of Slope, Offset, and Power is arithmetically defined.

Lift, Gamma, and Gain, instead of Slope, Offset, and Power, may be used as the color grading parameters.

As the color grading parameters, instead of the ASC-CDL, a 3D-LUT (3-Dimension Look-Up Table) may be employed, for example. Furthermore, the color grading parameters are not limited to the ASC-CDL and the 3D-LUT, and any parameters related to color and brightness may be employed.

In the above-described case, the color grading parameters are stored in the EDL and the EDL is supplied from the information terminal 12 to the editing apparatus 13. However, the color grading parameters may be supplied directly from the information terminal 12 to the editing apparatus 13 as metadata of the image without being stored in the EDL.

The editing apparatus 13 edits the image obtained by reflecting the metadata of the image data on the image data from the information terminal 12. The editing is performed in accordance with the operation of the editing apparatus 13 by a user who performs editing.

The edited image may be further subjected to color grading as necessary. A rough color grading or color grading to a certain extent in the information terminal 12 can reduce or eliminates the process of color grading after editing.

<Configuration Example of Information Terminal 12>

FIG. 2 is a block diagram illustrating a configuration example of hardware of the information terminal 12 illustrated in FIG. 1.

The information terminal 12 is configured in the same manner as a computer. In FIG. 2, the information terminal 12 includes a CPU (Central Processing Unit) 21, memory 22, a hard disk 23, a communication unit 24, an external interface 25, an operation unit 26, a speaker 27, and a touch panel 28.

The CPU 21 and the touch panel 28 are mutually connected via a bus.

The CPU 21 develops a program stored (installed) in the hard disk 23 to the memory 22, and executes the program to control each block constituting the information terminal 12 and execute predetermined processing.

The memory 22 and the hard disk 23 store the program executed by the CPU 21 or data necessary for the operation of the CPU 21.

The hard disk 23 also stores data that is necessarily retained when the power of the information terminal 12 is turned off.

The communication unit 24 controls communication through a wireless LAN, the Internet, Bluetooth (registered trademark), or the like.

A removable medium 25A, such as a disk recording medium or a memory card, is detachably attached to the external interface 25. The external interface 25 drives the removable medium 25A attached thereto.

The operation unit 26 is buttons that are physically operated (including operation mechanisms such as switch, lever, or key), and, in accordance with a user's operation, outputs signals corresponding to the operation on the bus.

The speaker 27 outputs sounds corresponding sound data supplied via the bus.

The touch panel 28 includes integrally formed display unit 29 and a position detection mechanism 30.

The display unit 29 is configured by an LCD (Liquid Crystal Display) or the like, and displays, for example, a GUI (Graphical User Interface) or another image corresponding to the image data supplied via the bus.

The position detection mechanism 30 detects the position of a touch on the touch panel 28, and supplies the detected position to the CPU 21 via the bus.

In the information terminal 12 configured in the above manner, a color grading application (program) for color grading is installed in the hard disk 23.

When a user operates the operation unit 26 or a GUI displayed on (the display unit 29 of) the touch panel 28 to instruct the start of the color grading application, the CPU 21 executes the color grading application. Thus, the information terminal 12 serves as a color grading apparatus that performs color grading.

Here, the color grading application may be recorded in advance on the hard disk 23 that is a recording medium incorporated in the information terminal 12 as a computer.

The color grading application may be stored in (recorded on) the removable medium 25A and installed from the removable medium 25A to the information terminal 12.

The color grading application may be downloaded through a communication network such as the Internet or a broadcasting network such as a terrestrial network to the information terminal 12 to be installed in the incorporated hard disk 23.

<Color Grading Apparatus>

FIG. 3 is a block diagram illustrating a configuration example of a color grading apparatus that is functionally achieved by the CPU 21 executing the color grading application.

Referring to FIG. 3, the color grading apparatus includes an image acquisition unit 31, a display control unit 32, an operation recognition unit 33, a parameter control unit 34, a parameter storage unit 35, and a parameter output unit 36.

The image acquisition unit 31 receives and acquires an image (image data) transmitted from the camera 11, and supplies the image (image data) to necessary blocks.

The display control unit 32 controls display so as to display a GUI and another image on the touch panel 28.

The operation recognition unit 33 recognizes an operation on the touch panel 28, and supplies the operation to necessary blocks.

In accordance with the operation on the touch panel 28, recognized by the operation recognition unit 33, the parameter control unit 34 adjusts color grading parameters (hereinafter also referred to as grading parameters or simply as parameters) of the image acquired by the image acquisition unit 31 (image captured by the camera 11).

The parameter storage unit 35 stores the grading parameters adjusted by the parameter control unit 34.

The parameter output unit 36 outputs (transmits) the grading parameters stored in the parameter storage unit 35 to an external apparatus such as the editing apparatus 13.

FIG. 4 is a flowchart illustrating an example of a process of the color grading apparatus illustrated in FIG. 3.

In step S11, the image acquisition unit 31 acquires an image transmitted from the camera 11 and supplies the image to the display control unit 32. The display control unit 32 causes the image from the image acquisition unit 31 to be displayed on the touch panel 28, and the process proceeds to step S12.

In step S12, in accordance with the user's operation on the touch panel 28, the parameter control unit 34 or the like performs the color grading process of adjusting grading parameters, and the process proceeds to step S13.

In step S13, the parameter storage unit 35 stores the grading parameters that have been adjusted through the color grading process, and the process proceeds to step S14.

In step S14, the parameter output unit 36 supplies the grading parameters stored in the parameter storage unit 35 as metadata of the image from the camera 11, in addition to the image, to the editing apparatus 13, and the process ends.

As a method of supplying the image and the color grading parameters from the parameter output unit 36 to the editing apparatus 13, any method can be employed, such as communication via a communication (transmission) medium or handover via a storage (recording) medium.

In the editing apparatus 13, in the above manner, (main) editing is performed using the image and color grading parameters supplied from the parameter output unit 36.

<Display Example of Touch Panel 28>

FIG. 5 illustrates a display example of a screen displayed by the color grading apparatus (the information terminal 12 serving as the color grading apparatus) on the touch panel 28.

When the CPU 21 executes the color grading application and the information terminal 12 serves as the color grading apparatus, in the color grading apparatus, the display control unit 32 causes the touch panel 28 to display a main screen 41.

FIG. 5 illustrates a display example of the main screen 41.

The main screen 41 includes a view screen 42 and parameter GUIs.

On the main screen 41, an approximately ⅔ area on the upper part serves as the view screen 42. In the ⅓ area on the lower part of the main screen 41, the parameter GUIs are disposed.

On the view screen 42, an image acquired by the image acquisition unit 31 from the camera 11 is displayed.

The parameter GUIs are GUIs related to the color grading parameters.

In FIG. 5, as the parameter GUIs, on the touch panel 28 are displayed a color circle 51, a parameter mark 51A, a button 52, a master bar 53, a color circle 61, a parameter mark 61A, a button 62, a master bar 63, a color circle 71, a parameter mark 71A, a button 72, a master bar 73, a saturation bar 81, an OK button 82, a reset button 83, and a ball setting button 84.

Here, as the color grading parameters, Lift, Gamma, and Gain are employed, for example.

The color circle 51 and the master bar 53 are parameter GUIs related to Lift corresponding to the lowermost part of a YC wave of the image displayed on the view screen 42, and are disposed on the lower left of the main screen 41.

The color circle 61 and the master bar 63 are parameter GUIs related to Gamma corresponding to the middle part of the YC wave of the image displayed on the view screen 42, and are adjacently disposed on the right of the parameter GUIs related to Lift (the color circle 51 and the master bar 53).

The color circle 71 and the master bar 73 are parameter GUIs related to Gain corresponding to the uppermost part of the YC wave of the image displayed on the view screen 42, and are adjacently disposed on the right of the parameter GUIs related to Gamma (the color circle 61 and the master bar 63).

Therefore, the parameter GUIs related to Lift, the parameter GUIs related to Gamma, and the parameter GUIs related to Gain are disposed in this order from the left to the right.

The color circle 51 is a circular GUI in which complementary hues are disposed at opposite positions on the circumference.

The parameter mark 51A is moved on the color circle 51 in accordance with a user's touch on the touch panel 28. The position of the parameter mark 51A on the color circle 51 represents the RGB value of Lift. That is, the parameter mark 51A represents the RGB value of Lift as the position on the color circle 51.

The button 52 is disposed on the upper left of the color circle 51, and is operated when the adjustment of Lift is activated. That is, the button 52 is a toggle switch by which ON and OFF are alternately switched at every touch. In a case in which the button 52 is in an on state, the adjustment of Lift is activated (enabled); in a case in which the button 52 is in an off state, the adjustment of Lift is deactivated (disabled).

The master bar 53 is disposed below the color circle 51, by which a scrub (swipe) operation is possible in the horizontal direction. The operation of the master bar 53 adjusts the brightness of Lift. The master bar 53 can be operated by operating the master bar 53 itself or by moving a touch at a given position on the touch panel 28.

Here, the RGB value and brightness of Lift are adjusted in accordance with a touch or the like at a given position on the touch panel 28 only when the button 52 is in the on state and the adjustment of Lift is active. In addition, in accordance with the adjustment of (the RGB value and brightness of) Lift, the parameter mark 51A and the master bar 53 are moved.

Both of the RGB value and brightness of Lift can be adjusted in accordance with a touch at a given position on the touch panel 28, for example.

Specifically, when a user touches one given position on the touch panel 28 once, in accordance with the movement of the touched position of the one touch, the RGB value and brightness of Lift can be selectively adjusted.

That is, for example, immediately after the user has touched the color circle 51, only the RGB value among the RGB value and brightness of Lift can be adjusted in accordance with the one touch at the given position on the touch panel 28. On the other hand, for example, immediately after the user has touched the master bar 53, only the brightness among the RGB value and brightness of Lift can be adjusted in accordance with the one touch at the given position on the touch panel 28.

In addition, when the user makes two touches at two given positions on the touch panel 28, in accordance with the movement of the upper touch position of the two touches, the RGB value of Lift can be adjusted, and in accordance with the movement of the lower touch position in the horizontal direction, the brightness of Lift can be adjusted.

Besides, the RGB value of Lift can be adjusted in accordance with a touch at a given position on the touch panel 28, and the brightness of Lift can be adjusted in accordance with the scrub operation of the master bar 53.

The color circle 61 and the master bar 63 are configured in the same manner as the color circle 51 and the master bar 53, respectively, except that the color circle 61 and the master bar 63 are parameter GUIs related to Gamma. The color circle 71 and the master bar 73 are configured in the same manner as the color circle 51 and the master bar 53, respectively, except that the color circle 71 and the master bar 73 are parameter GUIs related to Gain.

The saturation bar 81 is disposed on the right of the parameter GUIs related to Gain (the color circle 71 and the master bar 73), and can be operated by a scrub operation in the vertical direction. The operation of the saturation bar 81 adjusts the chroma of the image displayed on the view screen 42.

The OK button 82 is operated (touched) to confirm the adjustment of the grading parameters or the like.

The reset button 83 is operated to reset the grading parameters. For example, when the reset button 83 is touched, the parameter mark 51A of Lift returns to the center position of the color circle 51, and the RGB value of Lift is reset to the value corresponding to the center position of the color circle 51. The same applies to Gamma and Gain.

The ball setting button 84 is operated to perform various kinds of setting.

An example of the operation of the main screen 41 in adjustment of the grading parameters will be illustrated with reference to FIG. 6.

Hereinbelow, an example of the adjustment of the RGB values of Lift, Gamma, and Gain will be described, for example.

FIG. 6 illustrates a display example of the main screen 41.

In FIG. 6, among Lift, Gamma, and Gain, the button 72 of Gain is in the on state. Therefore, the adjustment of Gain is active, and the adjustment of Lift and Gamma is inactive.

The button 72 in the on state (the button 72 of Gain where the adjustment is active) is displayed in a different color, brightness, or the like from that in the off state so that the on state can be recognized.

Here, the grading parameter(s) whose adjustment is active is also referred to as an active parameter(s). In FIG. 6, only Gain is the active parameter.

Among three grading parameters of Lift, Gamma, and Gain, in a case in which one grading parameter, i.e., Gain in FIG. 6, is the active parameter, when the user makes one touch at a given position on the touch panel 28, the number of touches being the same as the number of active parameters, the one touch is allocated to Gain being the one active parameter.

Then, the RGB value of Gain being the active parameter is adjusted in accordance with the one touch allocated to Gain.

That is, for example, let us assume that the user touches a position P31 on the touch panel 28 and moves the touch as indicated by an arrow A31 on the touch panel 28.

In this case, the touch at the position P31 is allocated to Gain being the one active parameter.

In addition, in accordance with the movement of the touch at the position P31 indicated by the arrow A31, the RGB value of Gain, to which the touch is allocated, is adjusted.

That is, a vector obtained by multiplying the vector representing the arrow A31 by a predetermined (scalar) coefficient is obtained as an adjustment vector A32 that adjusts the grading parameter.

Then, the parameter mark 71A of Gain is moved from the previous position by the adjustment vector A32.

In this case, the RGB value of Gain is adjusted from the previous value by the vector corresponding to the adjustment vector A32, and becomes a value corresponding to the moved position of the parameter mark 71A of Gain.

Thus, the user can perform the color grading process with ease by an intuitive operation.

In the above manner, when the RGB value of Gain is adjusted, the image on the view screen 42 can be displayed by reflecting the adjusted RGB value of Gain.

In this case, the user can check the image in which the RGB value of Gain is adjusted.

FIG. 7 illustrates another example of the operation on the main screen 41 when the grading parameters are adjusted.

In FIG. 7, all the buttons 52, 62, and 72 among Lift, Gamma, and Gain are in on states, and the adjustment of all of Lift, Gamma, and Gain is active.

That is, in FIG. 7, three grading parameters of Lift, Gamma, and Gain are active parameters.

In this case, when the user makes three touches at given positions on the touch panel 28, the number of touches being the same as the number of active parameters, each of the three touches is allocated to the corresponding one of the three active parameters: Lift, Gamma, and Gain.

Then, in accordance with the touches allocated to Lift, Gamma, and Gain, the RGB values of Lift, Gamma, and Gain being the active parameters are each adjusted.

For example, let us assume that the user touches three positions P11, P21, and P31 on the touch panel 28.

In this case, in accordance with the arrangement order of the positions P11, P21, and P31, which are touch start positions of the three touches, and the arrangement order of the three buttons 52, 62, and 72 in the on states, each of the three touches is allocated to the corresponding one of the three active parameters: Lift, Gamma, and Gain.

That is, in the present embodiment, the buttons 52, 62, and 72 are arranged in this order in the x-axis direction (the direction from the left to the right), and in FIG. 7, the buttons 52, 62, and 72 are in on state.

Furthermore, in FIG. 7, the touch start positions P11, P21, and P31 are arranged in this order in the x-axis direction.

Touches are allocated to the active parameters in a manner that, for example, the arrangement order of the touch start positions corresponds to the arrangement order of the buttons of the active parameters.

In FIG. 7, the buttons 52, 62, and 72 of Lift, Gamma, and Gain being active parameters are arranged in this order in the x-axis direction.

Therefore, in FIG. 7, in order that the arrangement order of the touch start positions P11, P21, and P31 correspond to the arrangement order of the buttons 52, 62, and 72 of Lift, Gamma, and Gain, the touch at the leftmost touch start position P11 is allocated to Lift, which has become the active parameter by an on operation of the leftmost button 52.

In addition, the touch at the second touch start position P21 from the left is allocated to Gamma, which has become the active parameter by an on operation of the button 62 located at the second from the left.

Furthermore, the touch at the rightmost touch start position P31 is allocated to Gain, which has become the active parameter by an on operation of the rightmost button 72.

After that, in accordance with the respective movements of touches from the touch start positions P11, P21, and P31, the RGB values of Lift, Gamma, and Gain to which the respective touches are allocated are adjusted.

In FIG. 7, the touch at the touch start position P11 is moved as indicated by an arrow A11, and the touch at the touch start position P21 is moved as indicated by an arrow A21. Furthermore, the touch at the touch start position P31 is moved as indicated by the arrow A31.

In this case, vectors obtained by multiplying the respective vectors representing the arrows A11, A21, and A31 by a predetermined coefficient are obtained as adjustment vectors A12, A22, and A32 that adjust the grading parameters.

The parameter marks 51A, 61A, and 71A of Lift, Gamma, and Gain are moved from the previous positions by the adjustment vectors A12, A22, and A32, respectively.

In this case, the RGB values of Lift, Gamma, and Gain are adjusted from the previous values by the respective vectors corresponding to the adjustment vectors A12, A22, and A32, and become values corresponding to the moved positions of the parameter marks 51A, 61A, and 71A of Lift, Gamma, and Gain.

Furthermore, the image displayed on the view screen 42 is displayed by reflecting the adjusted RGB values of Lift, Gamma, and Gain.

In the above manner, the user can, for example, simultaneously adjust the three grading parameters of Lift, Gamma, and Gain by touches with three fingers.

Here, the user who performs color grading wants to check what the image will look like by adjusting a plurality of parameters of Lift, Gamma, Gain, and the like simultaneously by the same amount.

In the information terminal 12, for example, the three grading parameters of Lift, Gamma, and Gain can be adjusted simultaneously as described above. Accordingly, for example, it is possible to meet the user's demand of adjusting the plurality of parameters of Lift, Gamma, Gain, and the like simultaneously by the same amount.

Note that, also in a case in which buttons of two grading parameters among Lift, Gamma, and Gain (two buttons among the buttons 52, 62, and 72) are in the on states and two grading parameters among Lift, Gamma, and Gain are active parameters, as in the case in which the three grading parameters are active parameters, the active parameters can be adjusted.

That is, in a case in which two grading parameters have become active parameters, when the user makes two touches at given positions on the touch panel 28, the number of touches being the same as the number of active parameters, each of the two touches is allocated to the corresponding one of the two active parameters.

Then, the RGB value of each of the two active parameters is adjusted in accordance with the touch allocated to each of the two active parameters.

That is, in accordance with the arrangement order of the touch start positions of two touches and the arrangement order of the two on buttons (two buttons among the buttons 52, 62, and 72) in the on states, each of the two touches is allocated to the corresponding one of the two active parameters.

After that, in accordance with the movements of the respective two touches, the RGB values of the active parameters to which the respective touches are allocated are adjusted.

For example, in a case in which, among Lift, Gamma, and Gain, Lift and Gamma are the active parameters, when the user makes two touches at given positions on the touch panel 28, the number of touches being the same as the number of active parameters, the left touch of the two touches is allocated to Lift and the right touch is allocated to Gamma.

Then, in accordance with the movement of the left touch, the RGB value of Lift is adjusted, and also the parameter mark 51A of Lift is moved on the color circle 51.

Furthermore, in accordance with the movement of the right touch, the RGB value of Gamma is adjusted, and also the parameter mark 61A of Gamma is moved on the color circle 61.

Also, in a case in which, among Lift, Gamma, and Gain, given two grading parameters other than Lift and Gamma are the active parameters, two touches are allocated to the two active parameters, and in accordance with movements of the respective touches, the RGB values of the active parameters to which the touches are allocated are adjusted.

In the above manner, in the information terminal 12, the active parameters whose buttons (the buttons 52, 62, and 72) are in on states are adjusted in accordance with touches at given positions on the touch panel 28. Thus, the user can perform the color grading process with ease.

That is, after turning on the buttons (the buttons 52, 62, and 72) of grading parameters to be adjusted, by touching given positions on the touch panel 28, the user can adjust the grading parameters.

Note that the parameter GUIs related to Lift, Gamma, and Gain can also be arranged in the direction other than the direction from the left to the right (the x-axis direction), such as the direction from the top to the bottom (the y-axis direction). In this case, in accordance with the arrangement order of touch start positions in the y-axis direction, the touches can be allocated to active parameters.

Examples of operations on the main screen 41 in adjustment of a grading parameter(s) will be further illustrated with reference to FIGS. 8 to 15.

FIG. 8 illustrates a display example of the main screen 41 in a case in which, among the buttons 52, 62, and 72, only the button 52 of Lift is in the on state.

In FIG. 8, the button 52 of Lift, which is in the on state, is displayed in a different color, brightness, or the like from those of the buttons 62 and 72 in the off states.

In FIG. 8, among Lift, Gamma, and Gain, only Lift is the active parameter.

FIG. 9 illustrates a display example of the main screen 41 immediately after the user touches the touch panel 28 with one finger f11 in a case in which only Lift is the active parameter, as illustrated in FIG. 8.

When the finger f11 touches the touch panel 28, the display control unit 32 causes a circle (ball), for example, to be displayed as a touch mark M11 representing the touch position of the finger f11 on the touch panel 28.

Furthermore, the parameter control unit 34 allocates the touch with the finger f11 to Lift, which has become the active parameter.

The touch mark M11 can be displayed at the touch position of the finger f11 on the touch panel 28. In this case, however, the user might not see the touch mark M11 hidden under the finger f11. Accordingly, the touch mark M11 can be displayed at a position slightly shifted from the touch position of the finger f11 (e.g., a position diagonally upward from the touch position).

In this embodiment, for the visibility of the figure, as a method of displaying the touch mark, a method of displaying the touch mark at a position slightly shifted from the touch position of the finger is employed. However, as described above, as the method of displaying the touch mark, a method of displaying the touch mark at the touch position of the finger may be employed. In the case in which the touch mark is displayed at the touch position of the finger, for the visibility of the touch mark, the touch mark can be displayed in a larger size than the area of the touch position of the finger.

FIG. 10 illustrates a display example on the main screen 41 in a case in which the user moves the finger f11 after touching the touch panel 28 with the finger f11 as described above with reference to FIG. 9.

In a case in which the user moves the finger f11, the display control unit 32 moves the touch mark M11 in accordance with the movement of the finger f11.

For example, in a case in which the finger f11 is moved as indicated by an arrow A41, the touch mark M11 is moved by an arrow A42 that is predetermined times (for example, more than 0 times and less than or equal to 1 time) as long as the arrow A41.

In addition, the parameter control unit 34 obtains, as an adjustment vector that adjusts the grading parameter, a vector that is obtained by multiplying a vector representing the arrow A41 indicating the movement of the finger f11 by a predetermined coefficient.

Then, the display control unit 32 moves the parameter mark 51A of Lift from the previous position (the center of the color circle 51 in FIG. 10) by the adjustment vector.

Furthermore, the parameter control unit 34 adjusts the RGB value of Lift from the previous value by a vector corresponding to the adjustment vector, and sets the value to a value corresponding to the moved position of the parameter mark 51A of Lift.

The movement amount of the movement of the touch mark M11 in accordance with the movement of the finger f11 corresponds to the adjustment amount (vector) of the RGB value of Lift. Accordingly, by checking the movement of the touch mark M11 displayed on the touch panel 28, the user can briefly recognize the adjustment amount of the RGB value of Lift.

Note that the speed of movement of each of the touch mark M11 and the parameter mark 51A corresponds to the speed of movement of the touch.

FIG. 11 illustrates a display example of the main screen 41 immediately after the touch with the finger f11 on the touch panel 28 is released after the user moves the finger f11 as described above with reference to FIG. 10.

When the touch with the finger f11 is released, the display control unit 32 eliminates the touch mark M11 from the touch panel 28.

FIG. 12 illustrates a display example of the main screen 41 in a case in which, among the buttons 52, 62, and 72, the button 52 of Lift and the button 62 of Gamma are in the on states.

In FIG. 12, the button 52 of Lift and the button 62 of Gamm, which are in the on states, are displayed in different colors, brightness, or the like from that of the button 72 in the off state.

In FIG. 12, among Lift, Gamma, and Gain, Lift and Gamma are the active parameters.

FIG. 13 illustrates a display example of the main screen 41 immediately after the user touches the touch panel 28 with two fingers f21 and f22 in a case in which Lift and Gamma are the active parameters, as illustrated in FIG. 12.

When the two fingers f21 and f22 touch the touch panel 28, the parameter control unit 34 allocates the touches with the fingers f21 and f22 to Lift and Gamma, which are the active parameters, in accordance with the arrangement order of touch start positions of the touches with the fingers f21 and f22 and the arrangement order of the buttons 52 and 62 in the on states.

In FIG. 13, the buttons 52 and 62 in the on states are arranged in this order in the x-axis direction. In addition, in FIG. 13, the touch start positions of the touches with the fingers f21 and f22 are arranged in this order in the x-axis direction.

In order that the arrangement order of the touch start positions of the touches with the fingers f21 and f22 correspond to the arrangement order of the buttons 52 and 62 of Lift and Gamma, the parameter control unit 34 allocates the touch with the finger f21, whose touch start position is on the left, to Lift, which has become the active parameter by the on operation of the left button 52.

The parameter control unit 34 also allocates the touch with the finger f22, whose touch start position is on the right, to Gamma, which has become the active parameter by the on operation of the right button 62.

When the fingers f21 and f22 touch the touch panel 28, the display control unit 32 causes a touch mark M21 and a touch mark M22 to be displayed on the touch panel 28, the touch mark M21 representing the touch position of the finger f21, the touch mark M22 representing the touch position of the finger f22.

In FIG. 13, the touch mark M21 is displayed at a position slightly shifted from the touch position of the finger f21. In the same manner, the touch mark M22 is displayed at a position slightly shifted from the touch position of the finger f22.

FIG. 14 illustrates a display example of the main screen 41 in a case in which the user moves the fingers f21 and f22 after touching the touch panel 28 with the fingers f21 and f22, as described above with reference to FIG. 13.

In a case in which the user moves the fingers f21 and f22, the display control unit 32 moves the touch marks M21 and M22 in accordance with the movements of the fingers f21 and f22.

For example, in a case in which the finger f21 is moved as indicated by an arrow A51, as in the case of FIG. 10, the touch mark M21 is moved by an arrow A52 that is predetermined times as long as the arrow A51.

In addition, the parameter control unit 34 obtains, as an adjustment vector that adjusts the grading parameter, a vector that is obtained by multiplying a vector representing the arrow A51 indicating the movement of the finger f21 by a predetermined coefficient.

Then, the display control unit 32 moves the parameter mark 51A of Lift, to which the touch with the finger f21 is allocated, from the previous position (the center of the color circle 51 in FIG. 14) by the adjustment vector.

Furthermore, the parameter control unit 34 adjusts the RGB value of Lift from the previous value by a vector corresponding to the adjustment vector, and sets the value to a value corresponding to the moved position of the parameter mark 51A of Lift.

For example, in a case in which the finger f22 is moved as indicated by an arrow A61, as in the case of FIG. 10, the touch mark M22 is moved by an arrow A62 that is predetermined times as long as the arrow A61.

In addition, the parameter control unit 34 obtains, as the adjustment vector that adjusts the grading parameter, a vector that is obtained by multiplying a vector representing the arrow A61 indicating the movement of the finger f21 by a predetermined coefficient.

Then, the display control unit 32 moves the parameter mark 61A of Gamma, to which the touch with the finger f22 is allocated, from the previous position (the center of the color circle 61 in FIG. 14) by the adjustment vector.

Furthermore, the parameter control unit 34 adjusts the RGB value of Gamma from the previous value by a vector corresponding to the adjustment vector, and sets the value to a value corresponding to the moved position of the parameter mark 61A of Gamma.

As in the case of FIG. 10, the movement amounts of the movements of the touch marks M21 and M22 in accordance with the movements of the fingers f21 and f22 correspond to the adjustment amounts of the RGB values of Lift and Gamma. Accordingly, by checking the movements of the touch marks M21 and M22 displayed on the touch panel 28, the user can briefly recognize the adjustment amounts of the RGB values of Lift and Gamma.

FIG. 15 illustrates a display example of the main screen 41 immediately after the touches with the fingers f21 and f22 on the touch panel 28 are released after the user moves the fingers f21 and f22 as described above with reference to FIG. 14.

When the touches with the fingers f21 and f22 are released, the display control unit 32 eliminates the touch marks M21 and M22 from the touch panel 28.

Note that, after a plurality of touches, e.g., touches with the fingers f21 and f22 are made as illustrated in FIGS. 12 to 15 and are allocated to Lift and Gamma, respectively, which are the active parameters, the allocation of the touches to the active parameters do not change until the touches with the fingers f21 and f22 are released.

Therefore, after the touches with the fingers f21 and f22 are allocated to Lift and Gamma, which are active parameters, even when the touches with the fingers f21 and f22 cross, i.e., the touch with the finger f21 is moved to be located on the right side of the touch panel 28 and the touch with the finger f22 is moved to be located on the left side of the touch panel 28, the touch with the finger f21 is still allocated to Lift and the touch with the finger f22 is still allocated to Gamma.

<Color Grading Process>

FIG. 16 is a flowchart illustrating an example of the color grading process performed in step S12 in FIG. 4.

In step S21, the parameter control unit 34 determines whether or not any of the buttons 52, 62, and 72 has been operated on the main screen 41 (FIG. 5).

When none of the buttons 52, 62, and 72 is determined to have been operated in step S21, the process skips step S22 and proceeds to step S23.

When any of the buttons 52, 62, and 72 is determined to have been operated in step S21, the process proceeds to step S22.

In step S22, the display control unit 32 sets the display of the button that has been determined to have been operated in step S21 (hereinafter also referred to as operation determined button) among the buttons 52, 62, and 72 to an on state or an off state, and the process proceeds to step S23.

In step S22, in a case in which the display of the operation determined button is in the on state, the display is set to the off state. In step S22, in a case in which the display of the operation determined button is in the off state, the display is set to the on state.

In step S23, the parameter control unit 34 determines whether or not any button is in the on state (hereinafter also referred to as on-button) among the buttons 52, 62, and 72.

When it is determined that there is no on-button among the buttons 52, 62, and 72 in step S23, the process skips the steps S24 to S29 and proceeds to step S30.

When it is determined that there is one or more on-buttons among the buttons 52, 62, and 72 in step S23, the process proceeds to step S24.

In step S24, the parameter control unit 34 determines whether or not the number of touches on the touch panel 28 is equal to the number of on-buttons.

When it is determined that the number of touches is not equal to the number of on-buttons in step S24, the process skips steps S25 to S29 and proceeds to step S30.

When it is determined that the number of touches is equal to the number of on-buttons in step S24, the process proceeds to step S25.

In step S25, an allocation process is performed, in which parameter control unit 34 allocates the touch(es) that is equal to the on-button(s) in number to a parameter(s) (active parameter(s)) of the on-button(s) among the buttons 52, 62, and 72.

As described above, when the number of touches is equal to the number of on-buttons, the information terminal 12 performs the allocation process in which the touch(es) that is equal to the on-button(s) in number is allocated to a parameter(s) (active parameter(s)) of the on-button(s). Therefore, when the number of touches is not equal to the number of on-buttons, the allocation process is not performed, and thus, the parameter(s) is not adjusted.

That is, for example, in a case in which the number of on-buttons is three and the number of touches on the touch panel 28 is 1 or 2, when the one or two touches are moved, the adjustment of parameter(s) is not performed.

However, even in a case in which the number of touches is not equal to the number of on-buttons, it is possible to perform the allocation process and to adjust the parameter(s) in accordance with the movement(s) of the touch(es).

After step S25, the process proceeds to step S26, and the parameter control unit 34 determines whether or not the touch position(s) of the touch(es) on the touch panel 28 has been moved.

When it is determined that the touch position(s) has not been moved in step S26, the process skips steps S27 and S28, and proceeds to step S29.

When it is determined that the touch position(s) has been moved in step S26, in other words, when the user has moved a finger or the like that touches the touch panel 28, the process proceeds to step S27.

In step S27, in accordance with the movement(s) of the touch position(s), the parameter control unit 34 adjusts the value(s) of the active parameter(s) to which the touch(es) of the touch position(s) is allocated.

In step S27, in addition, in accordance with the movement(s) of the touch position(s), the display control unit 32 moves the touch mark(s) displayed on the touch panel 28 (e.g., the touch mark M11 illustrated in FIG. 10). Furthermore, in accordance with the movement(s) of the touch position(s), the display control unit 32 moves the parameter mark(s) of the active parameter(s) displayed on the touch panel 28 (e.g., the parameter mark 51A illustrated in FIG. 10), and the process proceeds from step S27 to step S28.

Note that, in this embodiment, the RGB values and brightness can be adjusted for Lift, Gamma, and Gain; however, as described above, the RGB values are adjusted here.

In step S28, the display control unit 32 reflects the active parameter(s) that has been adjusted in step S27 to the image displayed on the view screen 42 (FIG. 5), thereby causing the image reflecting the adjusted active parameter(s) on the view screen 42.

After that, the process proceeds from step S28 to step S29, and it is determined whether or not the touch(es) on the touch panel 28 has been released.

When it is determined that the touch(es) has not been released in step S29, the process returns to step S26, and afterward the same process is repeated.

When it is determined that the touch(es) has been released in step S29, the process proceeds to step S30, and the parameter control unit 34 determines whether or not a confirmation operation, e.g., a touch on the OK button 82, has been performed.

When it is determined that the confirmation operation has not been performed in step S29, the process returns to step S21, and afterward the same process is repeated.

When it is determined that the confirmation operation has been performed in step S29, the color grading process ends (returns).

<Allocation Process>

FIG. 17 is a flowchart illustrating an example of the allocation process performed in step S25 in FIG. 16.

The allocation process in step S25 is performed in a case in which it is determined that the number of touches is equal to the number of one or more on-buttons in step S24 in FIG. 16, and the number of touches is equal to the number of one or more on-buttons.

An i-th touch herein is a touch for an i-th time among the touches whose number is equal to the number of one or more on-buttons.

In addition, among the buttons of the active parameters whose number is equal to the number of on-buttons among the buttons 52, 62, and 72, an active parameter corresponding to a j-th button from the left is referred to as a j-th parameter.

For example, in a case in which Lift and Gamma are the active parameters among Lift, Gamma, and Gain, the buttons of the active parameters are the button 52 of Lift and the button 62 of Gamma.

In this case, since Lift is the active parameter corresponding to the leftmost button 52 of the button 52 of Lift and the button 62 of Gamma, Lift is a first parameter. In addition, since Gamma is the active parameter corresponding to the button 62, which is the second button from the left, of the button 52 of Lift and the button 62 of Gamma, Gamma is a second parameter.

For example, in a case in which Gamma and Gain are the active parameters among Lift, Gamma, and Gain, the buttons of the active parameters are the button 62 of Gamma and the button 72 of Gain.

In this case, since Gamma is the active parameter corresponding to the leftmost button 62 of the button 62 of Gamma and the button 72 of Gain, Gamma is a first parameter. In addition, since Gain is the active parameter corresponding to the button 72, which is the second button from the left, of the button 62 of Gamma and the button 72 of Gain, Gain is a second parameter.

In the allocation process, in step S41, the parameter control unit 34 determines whether or not the number of on-buttons (the number of buttons in the on states among the buttons 52, 62, and 72) is 1.

When it is determined that the number of on-buttons is 1 in step S41, in other words, when there are only one touch being a first touch as a touch and only one parameter being the first parameter as the active parameter, the process proceeds to step S42.

In step S42, the parameter control unit 34 allocates the first touch to the first parameter, and the allocation process ends (returns).

On the other hand, when it is determined that the number of on-buttons is not 1 in step S41, the process proceeds to step S43, and the parameter control unit 34 determines whether or not the number of on-buttons is 2.

When it is determined that the number of on-buttons is 2 in step S43, in other words, when there are two touches being the first touch and a second touch as touches and two parameters being the first parameter and the second parameter as the active parameters, the process proceeds to step S44.

In step S44, the parameter control unit 34 determines whether or not a first coordinate that is the x-coordinate of the first touch is less than or equal to a second coordinate that is the x-coordinate of the second touch.

When it is determined that the first coordinate is less than or equal to the second coordinate in step S44, in other words, when the first touch and the second touch are arranged in this order from the left, the process proceeds to step S45.

In step S45, the parameter control unit 34 allocates the first touch to the first parameter and the second touch to the second parameter, and the allocation process ends.

When it is determined that the first coordinate is not less than or equal to the second coordinate in step S44, in other words, the second touch and the first touch are arranged in this order from the left, the process proceeds to step S46.

In step S46, the parameter control unit 34 allocates the second touch to the first parameter and the first touch to the second parameter, and the allocation process ends.

On the other hand, when it is determined that the number of on-buttons is not two in step S43, in other words, when the number of on-buttons is three and there are three touches being the first touch to a third touch as touches and three parameters being the first parameter to a third parameter as the active parameters, the process proceeds to step S51 in FIG. 18.

FIG. 18 is a flowchart following FIG. 17.

In step S51, parameter control unit 34 determines whether or not the relationship of the first coordinate=<the second coordinate=<the third coordinate is satisfied, the first coordinate being the x-coordinate of the first touch, the second coordinate being the x-coordinate of the second touch, the third coordinate being the x-coordinate of the third touch.

When it is determined that the first coordinate to the third coordinate satisfy the relationship of the first coordinate=<the second coordinate=<the third coordinate in step S51, in other words, when the first touch, the second touch, and the third touch are arranged in this order from the left, the process proceeds to step S52.

In step S52, the parameter control unit 34 allocates the first touch to the first parameter, the second touch to the second parameter, and the third touch to the third parameter, and the allocation process ends.

When it is determined that the first coordinate to the third coordinate do not satisfy the relationship of the first coordinate=<the second coordinate=<the third coordinate in step S51, the process proceeds to step S53.

In step S53, parameter control unit 34 determines whether or not the relationship of the first coordinate=<the third coordinate=<the second coordinate is satisfied, the first coordinate being the x-coordinate of the first touch, the second coordinate being the x-coordinate of the second touch, the third coordinate being the x-coordinate of the third touch.

When it is determined that the first coordinate to the third coordinate satisfy the relationship of the first coordinate=<the third coordinate=<the second coordinate in step S53, in other words, when the first touch, the third touch, and the second touch are arranged in this order from the left, the process proceeds to step S54.

In step S54, the parameter control unit 34 allocates the first touch to the first parameter, the third touch to the second parameter, and the second touch to the third parameter, and the allocation process ends.

When it is determined that the first coordinate to the third coordinate do not satisfy the relationship of the first coordinate=<the third coordinate=<the second coordinate in step S53, the process proceeds to step S55.

In step S55, parameter control unit 34 determines whether or not the relationship of the second coordinate=<the first coordinate=<the third coordinate is satisfied, the first coordinate being the x-coordinate of the first touch, the second coordinate being the x-coordinate of the second touch, the third coordinate being the x-coordinate of the third touch.

When it is determined that the first coordinate to the third coordinate satisfy the relationship of the second coordinate=<the first coordinate=<the third coordinate in step S55, in other words, when the second touch, the first touch, and the third touch are arranged in this order from the left, the process proceeds to step S56.

In step S56, the parameter control unit 34 allocates the second touch to the first parameter, the first touch to the second parameter, and the third touch to the third parameter, and the allocation process ends.

When it is determined that the first coordinate to the third coordinate do not satisfy the relationship of the second coordinate=<the first coordinate=<the third coordinate in step S55, the process proceeds to step S57.

In step S57, parameter control unit 34 determines whether or not the relationship of the second coordinate=<the third coordinate=<the first coordinate is satisfied, the first coordinate being the x-coordinate of the first touch, the second coordinate being the x-coordinate of the second touch, the third coordinate being the x-coordinate of the third touch.

When it is determined that the first coordinate to the third coordinate satisfy the relationship of the second coordinate=<the third coordinate=<the first coordinate in step S57, in other words, when the second touch, the third touch, and the first touch are arranged in this order from the left, the process proceeds to step S58.

In step S58, the parameter control unit 34 allocates the second touch to the first parameter, the third touch to the second parameter, and the first touch to the third parameter, and the allocation process ends.

When it is determined that the first coordinate to the third coordinate do not satisfy the relationship of the second coordinate=<the third coordinate=<the first coordinate in step S57, the process proceeds to step S59.

In step S59, parameter control unit 34 determines whether or not the relationship of the third coordinate=<the first coordinate=<the second coordinate is satisfied, the first coordinate being the x-coordinate of the first touch, the second coordinate being the x-coordinate of the second touch, the third coordinate being the x-coordinate of the third touch.

When it is determined that the first coordinate to the third coordinate satisfy the relationship of the third coordinate=<the first coordinate=<the second coordinate in step S59, in other words, when the third touch, the first touch, and the second touch are arranged in this order from the left, the process proceeds to step S60.

In step S60, the parameter control unit 34 allocates the third touch to the first parameter, the first touch to the second parameter, and the second touch to the third parameter, and the allocation process ends.

When it is determined that the first coordinate to the third coordinate do not satisfy the relationship of the third coordinate=<the first coordinate=<the second coordinate in step S59, in other words, the first touch to the third touch are arranged in the order of the third touch, the second touch, and the first touch from the left, the process proceeds to step S61.

In step S61, the parameter control unit 34 allocates the third touch to the first parameter, the second touch to the second parameter, and the first touch to the third parameter, and the allocation process ends.

<Parameter Mark Moving Process>

FIG. 19 is a flowchart illustrating an example of a parameter mark moving process performed by the display control unit 32.

As described above with reference to FIG. 10 and the like, in accordance with the movement of the touch on the touch panel 28 with the finger or the like, the display control unit 32 causes the parameter mark 51A (61A, 71A) to be moved on the color circle 51 (61, 71).

The display control unit 32 limits the movement of the parameter mark 51A to the area of the color circle 51.

Accordingly, even when the touch is moved in a manner that the parameter mark 51A goes beyond the circle of the color circle 51, the parameter mark 51A stops moving when arriving at the circumference of the circle as the color circle 51.

In addition, in a case in which the movement of the parameter mark 51A is stopped, even when the touch is moved on the touch panel 28, the active parameter to which the touch is allocated (here, the RGB value of Lift) does not change.

The same applies to the parameter marks 61A and 71A.

In a moving process in which the parameter mark 51A (61A, 71A) is moved, the movement of the parameter mark 51A is limited to the area of the color circle 51 as described above.

That is, when the display control unit 32 determines whether or not the touch position on the touch panel 28 has been moved in step S81 and determines that the touch position has not been moved, the process returns to step S81.

When it is determined that the touch position has been moved in step S81, the process proceeds to step S82, and the display control unit 32 determines whether or not the parameter mark (parameter mark 51A, 61A, or 71A) of the parameter to which the touch whose touch position has been moved is allocated is located inside the color circle (color circle 51, 61, or 71).

Here, the inside of the color circle means the center side of the circumference of the circle as the color circle.

When it is determined that the parameter mark of the parameter to which the touch whose touch position has been moved is located inside the color circle in step S82, the process skips step S83 and proceeds to step S84.

In step S84, the display control unit 32 causes the parameter mark of the parameter to which the touch whose touch position has been moved is allocated to be moved in the color circle in accordance with the movement of the touch position, and the processing returns to step S81.

On the other hand, when it is determined that the parameter mark of the parameter to which the touch whose touch position has been moved is allocated is not located inside the color circle, in other words, when the parameter mark is located on the circumference of the circle as the color circle, the process proceeds to step S83.

In step S83, the display control unit 32 determines whether or not the moving direction of the touch position is a direction in which the parameter mark is moved toward the inside of the color circle.

When it is determined that the moving direction of the touch position is not the direction in which the parameter mark is moved toward the inside of the color circle in step S83, the process skips step S84 and returns to step S81.

Accordingly, in a case in which the parameter mark is located on the circumference of the color circle, even when the touch position is moved so as to move the parameter mark toward the outside of the color circle, the parameter mark is not moved.

On the other hand, when it is determined that the moving direction of the touch position is the direction in which the parameter mark is moved toward the inside of the color circle in step S83, the process proceeds to step S84.

In step S84, as described above, the display control unit 32 causes the parameter mark to be moved on the color circle in accordance with the movement of the touch position, and the process returns to step S81.

Accordingly, in a case in which the parameter mark is located on the circumference of the color circle, when the touch position is moved so as to move the parameter mark toward the inside of the color circle, the parameter mark is moved in accordance with the movement of the touch position.

The value of the parameter is limited to the value corresponding to a position in the area of the color circle, similarly to the parameter mark.

<Mode of Movement of Touch Mark>

FIG. 20 illustrates an example of a mode of a movement of a touch mark.

As described above with reference to FIG. 9 and the like, when a finger or the like touches the touch panel 28, the display control unit 32 causes the touch mark representing the touch position of the touch with the finger or the like to be displayed on the touch panel 28.

In addition, as described above with reference to FIG. 10 and the like, the display control unit 32 causes the touch mark to be moved and also causes the parameter mark (51A, 61A, or 71A) to be moved in accordance with the movement of the touch mark.

Then, as described above with reference to FIG. 11 and the like, when the touch is released, the display control unit 32 eliminates the touch mark from the touch panel 28.

In the above manner, in a case in which the touch is moved and then the touch is released, the display control unit 32 causes the touch mark to be moved and eliminated in accordance with the touch. As a mode of the movement of the touch mark immediately before the elimination of the touch mark, for example, a first mode can be employed in which the touch mark is stopped immediately in response to the release of the touch.

As another mode of the movement of the touch mark, for example, a second mode can be employed in which the touch mark fades out in response to the release of the touch while the touch mark is moved in accordance with the law of inertia.

FIG. 20 illustrates an example of the second mode of the movement of the touch mark.

When the touch on the touch panel 28 is started, the display control unit 32 causes a touch mark M to be displayed at a touch position of the touch (or a position slightly shifted from the touch position).

After that, when the touch on the touch panel 28 is moved, in accordance with the movement of the touch, for example, the display control unit 32 causes the touch mark M to be moved as indicated by an arrow A.

Then, when the touch on the touch panel 28 is released, the display control unit 32 causes the touch mark M to fade out while moving the touch mark M in accordance with the law of inertia.

Thus, the touch mark M on the touch panel 28 is displayed in a manner that, although as if the touch mark M is going to continue moving by inertia, the touch mark M reduces its moving speed by friction, air resistance, or the like to stop, while becoming transparent in accordance with the reduction in moving speed, and eventually disappears.

In the above manner, in the second mode of the movement of the touch mark, even after the touch is released, the touch mark M moves by inertia. In the same manner, the parameter mark (51A, 61A, or 71A) of the parameter to which the released touch is allocated moves by inertia on the color circle (51, 61, or 71), and in accordance with the movement of inertia, the (value of) parameter to which the released touch is allocated also changes.

According to the second mode of the movement of the touch mark, it is possible to provide operational feeling of adjusting the parameter using a physical (actual) track ball.

<Setting Process>

FIG. 21 is a flowchart illustrating an example of a setting process.

On the main screen 41 (FIG. 5), when the ball setting button 84 is tapped, the display control unit 32 displays a setting screen on the touch panel 28.

On the setting screen, for example, in the second mode of the movement of the touch mark described above with reference to FIG. 20, it is possible to set the movement amount (hereinafter also referred to as inertia movement amount) of the movement of the touch mark and the parameter mark by inertia.

In addition, on the setting screen, for example, it is possible to set, with respect to the movement of the touch, the movement amount of the movement of the touch mark and the parameter mark (that corresponds to the predetermined number when the arrow A41 is multiplied by the predetermined times as described with reference to FIG. 10, or the predetermined coefficient used to obtain the adjustment vector) (hereinafter also referred to as movement amount with operation).

FIG. 21 is a flowchart illustrating the setting process of setting the inertia movement amount and the movement amount with operation.

When the ball setting button 84 is tapped and the setting screen is displayed on the touch panel 28, the setting process is started.

On the setting screen, for example, the setting of the inertia movement amount and the movement amount with operation is enabled, and in step S91, the display control unit 32 determines whether or not the user has performed a setting operation of setting the inertia movement amount on the setting screen.

When it is determined that the setting operation of setting the inertia movement amount has not been performed in step S91, the process skips step S92 and proceeds to step S93.

When it is determined that the setting operation of setting the inertia movement amount has been performed in step S91, the process proceeds to step S92, the display control unit 32 sets the inertia movement amount in accordance with the setting operation, and the processing proceeds to step S93.

In step S93, the display control unit 32 determines whether or not the user has performed the setting operation of setting the movement amount with operation on the setting screen.

When it is determined that the setting operation of setting the movement amount with operation has not been performed in step S93, the process skips step S94 and proceeds to step S95.

When it is determined that the setting operation of setting the movement amount with operation has been performed in step S93, the processing proceeds to step S94, the display control unit 32 sets the movement amount with operation in accordance with the setting operation, and the process proceeds to step S95.

In step S95, the display control unit 32 determines whether or not the user has performed a confirmation operation of confirming the inertia movement amount and the movement amount with operation, which have been set in step S92 and S94 immediately before.

When it is determined that the confirmation operation has not been performed in step S95, the process returns to step S91, and afterward the same process is repeated.

When it is determined that the confirmation operation has been performed in step S95, the setting process ends.

<Another Embodiment of Image Processing System to Which the Present Technology is Applied>

FIG. 22 is a block diagram illustrating a configuration example of another embodiment of the image processing system to which the present technology is applied.

In the diagram, parts corresponding to those in FIG. 1 are denoted by the same reference numeral and a description thereof is omitted below as appropriate.

FIG. 22 is the same as FIG. 1 in that the image processing system includes the camera 11, the information terminal 12, and the editing apparatus 13.

However, the image processing system illustrated in FIG. 22 is different from that in FIG. 1 in that a display apparatus 14 is additionally provided.

In FIG. 1, the information terminal 12 acquires an image from the camera 11, and reflects the adjusted grading parameters obtained through the color grading process on the image to display the image on the view screen 42 (FIG. 5).

In contrast, in FIG. 22, the display apparatus 14 acquires an image from the camera 11 and also acquires the grading parameters from the information terminal 12 as metadata of the image, and reflects the grading parameters from the information terminal 12 on the image from the camera 11 to display the image.

That is, the information terminal 12 adjusts the grading parameters in accordance with a user's operation without acquiring the image from the camera 11, and supplies the adjusted grading parameters to the editing apparatus 13 and the display apparatus 14.

In the display apparatus 14, the image from the camera 11 is displayed by reflecting the grading parameters from the information terminal 12.

Furthermore, the image from the camera 11 is supplied to the editing apparatus 13 directly or via the display apparatus 14.

In the editing apparatus 13, editing is performed on the image that is obtained by reflecting the grading parameters from the information terminal 12 on the image from the camera 11.

In the image processing system illustrated in FIG. 1, by operating the information terminal 12 while seeing the image displayed in the information terminal 12, the user performs the process of color grading. In this case, the information terminal 12 serves as a controller to be operated to adjust the grading parameters and also serves as a monitor to check the image reflecting the adjusted grading parameters.

On the other hand, in the image processing system illustrated in FIG. 22, by operating the information terminal 12 while seeing the image displayed in the display apparatus 14, the user can perform the process of color grading. In this case, the information terminal 12 serves as a controller to be operated to adjust the grading parameters, and the display apparatus 14 serves as a monitor to check the image reflecting the adjusted grading parameters.

In FIG. 22, the information terminal 12 can provide the grading parameters to the camera 11. In this case, in the camera 11 at the image-capturing site, the grading parameters can be reflected on the image captured by the camera 11.

In the above manner, in the information terminal 12, the active parameters whose buttons (buttons 51, 61, and 71) are in on states, the buttons being operated when the adjustment of the parameters is activated, are adjusted in accordance with a touch at a given position on the touch panel 28. Thus, the information terminal 12 is a mobile terminal, and even when the touch panel 28 is small, the parameters can be fine adjusted with ease, enabling color grading with high precision.

In addition, in the information terminal 12, it is possible to turn on a plurality of buttons (buttons 51, 61, and 71) and to simultaneously adjust a plurality of active parameters corresponding to the plurality of button in the on states by touches with a plurality of fingers or the like.

Furthermore, in the information terminal 12, the plurality of touches are allocated to the plurality of active parameters in a manner that the arrangement order of the plurality of touches corresponds to the arrangement order of the parameter GUIs of the plurality of active parameters. Thus, it is possible to intuitively recognize and adjust the active parameters to which the touches are allocated.

In the information terminal 12, as the mode of the movement of the touch mark, it is possible to employ the second mode in which the touch mark is made to fade out while being moved in accordance with the law of inertia in response to release of the touch. Thus, it is possible to provide operation feeling as if the grading parameter is adjusted using an actual track ball.

Note that, as the information terminal 12, a desktop-type terminal can be employed instead of a mobile terminal.

The present technology can be applied to a terminal in which a pointing device, such as a mouse, can be used in addition to the information terminal 12 including the touch panel 28. The "touch" herein can include, not only the touch on the touch panel, but also designation of a position on the screen by a click or drag of a mouse, as necessary.

In this embodiment, as buttons that activate the adjustment of parameters, the dedicated buttons, buttons 52, 62, and 72, are provided; however, such dedicated buttons 52, 62, and 72 do not always have to be provided.

In a case in which the dedicated buttons 52, 62, and 72 are not provided, for example, the color circles 51, 61, and 71 can also be used as buttons that activate the adjustment of the RGB values of Lift, Gamma, and Gain.

Similarly, for example, the master bars 53, 63, and 73 can also be used as buttons that activate the adjustment of brightness of Lift, Gamma, and Gain.

In a case in which the color circles 51, 61, and 71 and the master bars 53, 63, and 73 are also used as the buttons that activate the adjustment of the parameters as described above, for example, the RGB value of Lift, the adjustment of which is activated by a touch of the color circle 51, and the brightness of Lift, the adjustment of which is activated by a touch of the master bar 53 can be exclusive active parameters.

That is, when the color circle 51 is touched, the adjustment of the RGB value of Lift is activated. However, at this time, in a case in which the adjustment of the brightness of Lift is active, the adjustment of the brightness of Lift is deactivated.

Similarly, when the master bar 53 is touched, the adjustment of the brightness of Lift is activated. However, at this time, in a case in which the adjustment of the RGB value of Lift is active, the adjustment of the RGB value of Lift is deactivated.

The same applies to Gamma and Gain.

In this embodiment, the parameter GUIs related to each of Lift, Gamma, and Gain are arranged in the horizontal direction of the main screen 41. However, the parameter GUIs related to each of the Lift, Gamma, and Gain may be arranged in a direction other than the horizontal direction, for example, a vertical direction.

In a case in which the parameter GUIs related to each of the Lift, Gamma, and Gain are arranged in the vertical direction, for example, each of the touches that are the same as the active parameters in number is allocated to the corresponding one of the active parameters in a manner that the y-axis-direction arrangement order of the parameter GUIs related to the parameters being the active parameters corresponds to the y-axis-direction arrangement order of the touch start positions of the touches that are the same as the active parameters in number.

As the buttons that activate the adjustment of the parameters, it is possible to employ, not only the dedicated buttons 52, 62, and 72 and color circles 51, 61, and 71, but also the number of touches on the touch panel 28.

That is, in accordance with the number of touches on the touch panel 28, among Lift, Gamma, and Gain, the grading parameter(s) that are the same as the touches in number can be activated.

For example, in a case in which the number of touches on the touch panel 28 is one, one grading parameter among Lift, Gamma, and Gain can be activated. In addition, in a case in which the number of touches on the touch panel 28 is two, two grading parameters (Lift and Gamma, Lift and Gain, or Gamma and Gain) among Lift, Gamma, and Gain can be activated. Furthermore, in a case in which the number of touches on the touch panel 28 is three, all the grading parameters among Lift, Gamma, and Gain can be activated.

In a case in which the number of touches on the touch panel 28 is one or two, which of Lift, Gamma, and Gain is to be activated can be set on the setting screen or the like displayed when the ball setting button 84 is operated, for example.

Here, in this specification, the processing steps executed by a computer (the CPU 21) in accordance with a program do not always have to be executed in a time-sequential manner in the order described as the flowchart. That is, processing executed by the computer in accordance with the program includes processing in a parallel or discrete manner (for example, parallel processing or object-based processing).

Furthermore, with regard to the program, processing may be carried out by one computer (one processor), or processing may be carried out in a distributed manner by a plurality of computers. In addition, the program may be transferred to a remote computer and executed.

Further, in this specification, a system has the meaning of a set of a plurality of structural elements (such as an apparatus or a module (part)), and does not take into account whether or not all the structural elements are in the same casing. Therefore, the system may be either a plurality of apparatuses stored in separate casings and connected through a network, or an apparatus in which a plurality of modules are stored within a single casing.

An embodiment of the present technology is not limited to the embodiments described above, and various changes and modifications may be made without departing from the scope of the present technology.

For example, the present technology can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case in which a plurality of processes are included in one step, the plurality of processes included in this one step can be executed by one apparatus or by allocating a plurality of apparatuses.

The effects described in the specification are not limiting. That is, the present disclosure can exhibit other effects.

Additionally, the present technology may also be configured as below.

<1>
An information processing apparatus including:
a parameter control unit configured to adjust, among a plurality of parameters related to color or brightness, an active parameter that is a parameter whose button is in an on state in accordance with a touch at a given position on a touch panel, the button being operated when adjustment of the parameter is activated.

<2>
The information processing apparatus according to <1>,
wherein, in a case in which a plurality of buttons are in on states, the parameter control unit adjusts a plurality of active parameters in accordance with a plurality of touches on the touch panel, the active parameters corresponding to the respective buttons in the on states.

<3>
The information processing apparatus according to <2>,
wherein the parameter control unit allocates each of the plurality of touches to a corresponding one of the plurality of active parameters in accordance with a touch start position of each of the plurality of touches.

<4>
The information processing apparatus according to <3>,
further including:
a display control unit configured to cause the button for each of the plurality of parameters to be displayed on the touch panel,
wherein the parameter control unit allocates each of the plurality of touches to the corresponding one of the plurality of active parameters in accordance with an arrangement order of the buttons in the on states and the touch start positions of the plurality of touches on the touch panel.

<5>
The information processing apparatus according to <4>,
wherein the display control unit causes a parameter GUI related to a parameter to be displayed on the touch panel for each of the plurality of parameters, the parameter GUI including the button, and
wherein the parameter GUI includes, in addition to the button, a color circle and a parameter mark that indicates a value of the parameter as a position on the color circle.

<6>
The information processing apparatus according to <5>,
wherein the display control unit
causes a touch mark following a movement of the touch to be displayed on the touch panel, and
causes the touch mark and the parameter mark to be moved in accordance with the movement of the touch.

<7>
The information processing apparatus according to <6>,
wherein, when the touch starts, the display control unit causes the touch mark to be displayed, and when the touch is moved and then is released, the display control unit causes the touch mark to fade out while the touch mark is moved in accordance with a law of inertia.

<8>
The information processing apparatus according to <6> or <7>,
wherein the display control unit limits movement of the parameter mark to an inside of an area of the color circle.

<9>
The information processing apparatus according to any of <6> to <8>,
wherein the display control unit causes a setting screen to be displayed on the touch panel, the setting screen being configured to set movement amounts of the touch mark and the parameter mark in accordance with the movement of the touch.

<10>
The information processing apparatus according to any of <4> to <9>,
wherein the display control unit further causes an image reflecting the parameter to be displayed on the touch panel.

<11>
The information processing apparatus according to any of <1> to <10>, further including:
the touch panel.

<12>
The information processing apparatus according to any of <1> to <11>,
wherein the plurality of parameters are Lift, Gamma, and Gain, or Slope, Offset, and Power.

<13>
An information processing method including:
adjusting, among a plurality of parameters related to color or brightness, an active parameter that is a parameter whose button is in an on state in accordance with a touch at a given position on a touch panel, the button being operated when adjustment of the parameter is activated.

<14>
A program causing a computer to function as
a parameter control unit configured to adjust, among a plurality of parameters related to color or brightness, an active parameter that is a parameter whose button is in an on state in accordance with a touch at a given position on a touch panel, the button being operated when adjustment of the parameter is activated.

<15>

A display apparatus including:

a parameter control unit configured to adjust, among a plurality of parameters related to color or brightness, an active parameter that is a parameter whose button is in an on state in accordance with a touch at a given position on a touch panel, the button being operated when adjustment of the parameter is activated;

a display control unit configured to cause an image reflecting the parameter to be displayed on the touch panel; and the touch panel.

<16>

An information processing apparatus comprising:

circuitry configured to adjust an active parameter in accordance with touch on a touch panel in a first area other than a second area corresponding to a parameter graphical user interface (GUI) area, wherein the active parameter is a parameter related to color or brightness selected from among a plurality of selectable parameters related to color or brightness of an image captured by an imaging device.

<17>

The information processing apparatus according to <16>, wherein the circuitry is configured to, in a case in which a plurality of buttons are in on states, adjust a plurality of active parameters in accordance with a plurality of touches on the touch panel in the first area, the active parameters corresponding to the respective buttons in the on states.

<18>

The information processing apparatus according to <16> or <17>, wherein the circuitry is configured to allocate each of the plurality of touches to a corresponding one of the plurality of active parameters based on a touch start position in the first area of each of the plurality of touches.

<19>

The information processing apparatus according to any one of <16> to <18>, wherein the circuitry is configured to cause the button for each of the plurality of parameters to be displayed in the second area on the touch panel, and allocate each of the plurality of touches to the corresponding one of the plurality of active parameters based on an arrangement order of the buttons in the on states and the touch start positions of the plurality of touches on the touch panel.

<20>

The information processing apparatus according to any one of <16> to <19>, wherein the circuitry is configured to cause the parameter (GUI) area, which is related to a parameter, to be displayed on the touch panel for each of the plurality of parameters, the parameter GUI including the button, and wherein the parameter GUI includes, in addition to the button, a color circle and a parameter mark that indicates a value of the parameter as a position on the color circle.

<21>

The information processing apparatus according to any one of <16> to <20>, wherein the circuitry is configured to cause a touch mark following a movement of the touch to be displayed in the first area of the touch panel, and cause the touch mark and the parameter mark to be moved in accordance with the movement of the touch in the first area of the touch panel.

<22>

The information processing apparatus according to any one of <16> to <21>, wherein the circuitry is configured to, when the touch starts, cause the touch mark to be displayed in the first area of the touch panel, and when the touch is moved in the first area of the touch panel and then is released, cause the touch mark to fade out while the touch mark is moved in accordance with a law of inertia.

<23>

The information processing apparatus according to any one of <16> to <22>, wherein the circuitry is configured to limit movement of the parameter mark to inside an area of the color circle.

<24>

The information processing apparatus according to any one of <16> to <23>, wherein the circuitry is configured to cause a setting screen to be displayed on the touch panel, the setting screen being configured to set movement amounts of the touch mark and the parameter mark in accordance with the movement of the touch in the first area of the touch panel.

<25>

The information processing apparatus according to any one of <16> to <24>, wherein the circuitry is configured to cause an image reflecting the parameter to be displayed on the touch panel.

<26>

The information processing apparatus according to any one of <16> to <25>, further comprising:

the touch panel.

<27>

The information processing apparatus according to any one of <16> to <26>, wherein the plurality of parameters are Lift, Gamma, and Gain, or Slope, Offset, and Power.

<28>

The information processing apparatus according to any one of <16> to <27>, wherein the circuitry is configured to receive data corresponding to an image from an imaging apparatus; and output the adjusted active parameter as metadata of the image.

<29>

The information processing apparatus according to any one of <16> to <28>, wherein the information processing apparatus is a mobile terminal.

<30>

The information processing apparatus according to any one of <16> to <29>, wherein the information processing apparatus is configured to wirelessly receive image data and process the wirelessly received image data using the circuitry.

<31>

The information processing apparatus according to any one of <16> to <30>, wherein the first area is an area to display one or more images.

<32>

An information processing method comprising:

adjusting an active parameter in accordance with touch on a touch panel in a first area other than a second area corresponding to a parameter graphical user interface (GUI) area, wherein the active parameter is a parameter related to color or brightness selected from among a plurality of selectable parameters related to color or brightness of an image captured by an imaging device.

<33>

A non-transitory computer-readable storage medium storing computer-readable instructions that, when executed by a computer, cause the computer to perform a method comprising:

adjusting an active parameter in accordance with touch on a touch panel in a first area other than a second area corresponding to a parameter graphical user interface (GUI) area, wherein the active parameter is a parameter related to color or brightness selected from among a plurality of selectable parameters related to color or brightness of an image captured by an imaging device.

<34>

A display apparatus comprising:

circuitry configured to adjust an active parameter in accordance with touch on a touch panel in a first area other than a second area corresponding to a parameter graphical user interface (GUI) area, and cause an image reflecting the parameter to be displayed on the touch panel; and the touch panel, wherein the active parameter is a parameter related to color or brightness selected from among a plurality of selectable parameters related to color or brightness of an image captured by an imaging device.

<35>

A system comprising:

an information processing apparatus having circuitry configured to adjust an active parameter in accordance with touch on a touch panel in a first area other than a second area corresponding to a parameter graphical user interface (GUI) area; and an imaging apparatus having circuitry configured to output data regarding an image to the information processing apparatus, wherein the active parameter is a parameter related to color or brightness selected from among a plurality of selectable parameters related to color or brightness of the image captured by the imaging apparatus.

<36>

The system according to <35>, wherein the information processing apparatus is part of a display apparatus, the display apparatus including:

display circuitry configured to cause an image reflecting the parameter to be displayed on the touch panel, and the touch panel.

REFERENCE SIGNS LIST 11 camera
12 information terminal
13 editing apparatus
14 display apparatus
21 CPU
22 memory
23 hard disk
24 communication unit
25 external interface
25A removable medium
26 operation unit
27 speaker
28 touch panel
29 display unit
30 position detection mechanism
31 image acquisition unit
32 display control unit
33 operation recognition unit
34 parameter control unit
35 parameter storage unit
36 parameter output unit
41 main screen
42 view screen
51 color circle
51A parameter mark
52 button
53 master bar
61 color circle
61A parameter mark
62 button
63 master bar
71 color circle
71A parameter mark
72 button
73 master bar
81 saturation bar
82 OK button
83 reset button
84 ball setting button

The invention claimed is:

1. An information processing apparatus, comprising:
circuitry configured to
adjust an active parameter in accordance with touch on a touch panel in a first area other than a second area corresponding to a parameter graphical user interface (GUI) area, and
when a plurality of buttons are in on states, adjust a plurality of active parameters including the active parameter in accordance with a plurality of touches on the touch panel in the first area, the plurality of active parameters corresponding to the respective plurality of buttons in the on states, the plurality of touches including the touch,
wherein the active parameter is a parameter related to color or brightness selected from among a plurality of selectable parameters related to color or brightness of an image captured by an imaging device.

2. The information processing apparatus according to claim 1, wherein the circuitry is further configured to allocate each of the plurality of touches to a corresponding one of the plurality of active parameters based on a touch start position in the first area of each of the plurality of touches.

3. The information processing apparatus according to claim 2, wherein the circuitry is further configured to
cause the button for each of the plurality of parameters to be displayed in the second area on the touch panel, and
allocate each of the plurality of touches to the corresponding one of the plurality of active parameters based on an arrangement order of the buttons in the on states and the touch start positions of the plurality of touches on the touch panel.

4. The information processing apparatus according to claim 3, wherein the circuitry is further configured to cause the parameter GUI area, which is related to a parameter, to be displayed on the touch panel for each of the plurality of parameters, the parameter GUI area including the button, and wherein the parameter GUI area includes, in addition to the button, a color circle and a parameter mark that indicates a value of the parameter as a position on the color circle.

5. The information processing apparatus according to claim 4, wherein the circuitry is further configured to cause a touch mark following a movement of the touch to be displayed in the first area of the touch panel, and cause the touch mark and the parameter mark to be moved in accordance with the movement of the touch in the first area of the touch panel.

6. The information processing apparatus according to claim 5, wherein the circuitry is further configured to, when the touch starts, cause the touch mark to be displayed in the first area of the touch panel, and when the touch is moved in the first area of the touch panel and then is released, cause the touch mark to fade out while the touch mark is moved in accordance with a law of inertia.

7. The information processing apparatus according to claim 5, wherein the circuitry is configured to limit movement of the parameter mark to inside an area of the color circle.

8. The information processing apparatus according to claim 5, wherein the circuitry is further configured to cause a setting screen to be displayed on the touch panel, the setting screen being configured to set movement amounts of the touch mark and the parameter mark in accordance with the movement of the touch in the first area of the touch panel.

9. The information processing apparatus according to claim 3, wherein the circuitry is further configured to cause an image reflecting the parameter to be displayed on the touch panel.

10. The information processing apparatus according to claim 1, further comprising:

the touch panel.

11. The information processing apparatus according to claim 1, wherein the plurality of parameters are Lift, Gamma, and Gain, or Slope, Offset, and Power.

12. The information processing apparatus according to claim 1, wherein the circuitry is configured to receive data corresponding to an image from an imaging apparatus; and output the adjusted active parameter as metadata of the image.

13. The information processing apparatus according to claim 1, wherein the information processing apparatus is a mobile terminal.

14. The information processing apparatus according to claim 1, wherein the information processing apparatus is configured to wirelessly receive image data and process the wirelessly received image data using the circuitry.

15. The information processing apparatus according to claim 1, wherein the first area is an area to display one or more images.

16. An information processing method, comprising:

adjusting an active parameter in accordance with touch on a touch panel in a first area other than a second area corresponding to a parameter graphical user interface (GUI) area; and when a plurality of buttons are in on states, adjusting a plurality of active parameters including the active parameter in accordance with a plurality of touches on the touch panel in the first area, the plurality of active parameters corresponding to the respective plurality of buttons in the on states, the plurality of touches including the touch, wherein the active parameter is a parameter related to color or brightness selected from among a plurality of selectable parameters related to color or brightness of an image captured by an imaging device.

17. A non-transitory computer-readable storage medium storing computer-readable instructions that, when executed by a computer, cause the computer to perform a method, comprising:

adjusting an active parameter in accordance with touch on a touch panel in a first area other than a second area corresponding to a parameter graphical user interface (GUI) area; and when a plurality of buttons are in on states, adjusting a plurality of active parameters including the active parameter in accordance with a plurality of touches on the touch panel in the first area, the plurality of active parameters corresponding to the respective plurality of buttons in the on states, the plurality of touches including the touch, wherein the active parameter is a parameter related to color or brightness selected from among a plurality of selectable parameters related to color or brightness of an image captured by an imaging device.

18. A system, comprising:

an information processing apparatus having circuitry configured to adjust an active parameter in accordance with touch on a touch panel in a first area other than a second area corresponding to a parameter graphical user interface (GUI) area, and when a plurality of buttons are in on states, adjust a plurality of active parameters including the active parameter in accordance with a plurality of touches on the touch panel in the first area, the plurality of active parameters corresponding to the respective plurality of buttons in the on states, the plurality of touches including the touch; and an imaging apparatus having circuitry configured to output data regarding an image to the information processing apparatus, wherein the active parameter is a parameter related to color or brightness selected from among a plurality of selectable parameters related to color or brightness of the image captured by the imaging apparatus.

19. The system according to claim 18, wherein the information processing apparatus is part of a display apparatus, the display apparatus including display circuitry configured to cause an image reflecting the parameter on the touch panel, and the touch panel.

* * * * *